(12) United States Patent
Rolt et al.

(10) Patent No.: US 9,594,165 B2
(45) Date of Patent: *Mar. 14, 2017

(54) SPEED SENSOR

(71) Applicant: Airmar Technology Corporation, Milford, NH (US)

(72) Inventors: Kenneth D. Rolt, Westford, MA (US); Frederic S. Boericke, II, Mont Vernon, NH (US); Danny J. Fladung, Springfield, NH (US)

(73) Assignee: AIRMAR TECHNOLOGY CORPORATION, Milford, NH (US)

( * ) Notice: Subject to any disclaimer, the term of this patent is extended or adjusted under 35 U.S.C. 154(b) by 579 days.

This patent is subject to a terminal disclaimer.

(21) Appl. No.: 14/075,892

(22) Filed: Nov. 8, 2013

(65) Prior Publication Data

US 2014/0142887 A1    May 22, 2014

Related U.S. Application Data

(63) Continuation-in-part of application No. 13/673,818, filed on Nov. 9, 2012.

(51) Int. Cl.
  *G01S 13/00* (2006.01)
  *G01S 15/58* (2006.01)
(52) U.S. Cl.
  CPC .................................. *G01S 15/58* (2013.01)
(58) Field of Classification Search
  CPC ... G01S 7/526; G01P 5/22; G01P 5/20; G01R 33/5608; G06F 17/00
  See application file for complete search history.

(56) References Cited

U.S. PATENT DOCUMENTS

| | | | |
|---|---|---|---|
| 3,333,238 A | * | 7/1967 | Caldwell ............... G01V 1/44 340/854.1 |
| 3,596,513 A | | 8/1971 | Sandstedt |
| 3,795,893 A | | 3/1974 | Kritz et al. |
| 3,885,873 A | | 5/1975 | Andermo |
| 4,555,938 A | | 12/1985 | Boucher et al. |
| 4,644,787 A | | 2/1987 | Boucher et al. |
| 4,644,788 A | | 2/1987 | Boucher |

(Continued)

FOREIGN PATENT DOCUMENTS

| | | |
|---|---|---|
| EP | 1892523 A1 | 2/2008 |
| EP | 1634087 B1 | 4/2009 |
| GB | 2092748 A | 2/1981 |

OTHER PUBLICATIONS

U.S. Appl. No. 13/673,818 Office Action dated Oct. 5, 2015 entitled "Speed Sensor."

(Continued)

*Primary Examiner* — Elias Desta
(74) *Attorney, Agent, or Firm* — Hamilton, Brook, Smith & Reynolds, P.C.

(57) ABSTRACT

Embodiments relate to a speed sensor and a speed sensing method for measuring relative speeds of receivers with respect to particles in a fluid by detecting individual particles. A receiver generates a plurality of signals related to reflections from particles in a region being monitored. A sampling circuit samples the signals, and a processing device processes the signals according to a particle detection scheme to determine speed. Concomitant use of the same receivers allows depth measurement.

14 Claims, 17 Drawing Sheets

(56) References Cited

U.S. PATENT DOCUMENTS

| | | | |
|---|---|---|---|
| 4,836,020 | A | 6/1989 | Boucher |
| 4,898,029 | A | 2/1990 | Boucher |
| 5,000,566 | A | 3/1991 | Kuppenheimer, Jr. |
| 5,089,996 | A | 2/1992 | Masreliez |
| RE33,982 | E | 7/1992 | Boucher |
| 5,235,557 | A | 8/1993 | Masreliez |
| 5,581,025 | A | 12/1996 | Boucher et al. |
| 5,581,515 | A | 12/1996 | Masreliez |
| 5,606,253 | A | 2/1997 | Boucher et al. |
| 5,719,824 | A | 2/1998 | Boucher |
| 6,426,918 | B1 | 7/2002 | Bartz et al. |
| 6,671,225 | B2 | 12/2003 | Bartz et al. |
| 6,678,208 | B2 | 1/2004 | Sifferman et al. |
| 6,904,798 | B2 | 6/2005 | Boucher et al. |
| 7,110,908 | B2 | 9/2006 | Boucher et al. |
| 7,352,171 | B2 | 4/2008 | Boucher et al. |
| 7,505,367 | B2 * | 3/2009 | Abdi .................. H04B 11/00 367/134 |
| 8,726,733 | B2 | 5/2014 | Hashimoto |
| 2003/0099156 | A1 | 5/2003 | Sifferman et al. |
| 2003/0185101 | A1 | 10/2003 | Wildey |
| 2008/0087099 | A1 * | 4/2008 | Allenberg .............. G01F 1/662 73/861.08 |
| 2014/0136142 | A1 | 5/2014 | Rolt et al. |

OTHER PUBLICATIONS

GB 1319655.5 Search Report dated May 7, 2014 entitled "Speed Sensor".

www.airmar.com, "CS4500," Airmar Technology Corporation Sensing Technolgy, Inc., 2 pages, on Feb. 3, 2011.

Boltryk, P., et al., "An ultrasonic transducer array for velocity measurement in underwater vehicles", *Ultrasonics*, 42: 473-478 (2004).

Campanella, G., et al., "Correlation—Log-Based Underwater Navigation", *Proceedings of the (1990) Symposium on Autonomous Underwater Vehicle Technology*, pp. 186-193 (Jun. 5-6, 1990).

Griffiths, G., et al., "A correlation speed log for deep waters", *Sea Technology*, 39(3): 29-35 (1998).

McFarlane, N.J.B., et al., "Segmentation and tracking of piglets in images", *Machine Vision and Applications*, 8: 187-193 (1995).

Stevens, P.J., et al., "Design, Calibaration and Evaluation of a Two Axis Correleation Log for Use on an Autonomous Underwater Vehicle", *Proceedings of the (1990) Symposium on Autonomous Underwater Vehicle Technology*, pp. 186-193 (Jun. 5-6, 1990).

\* cited by examiner

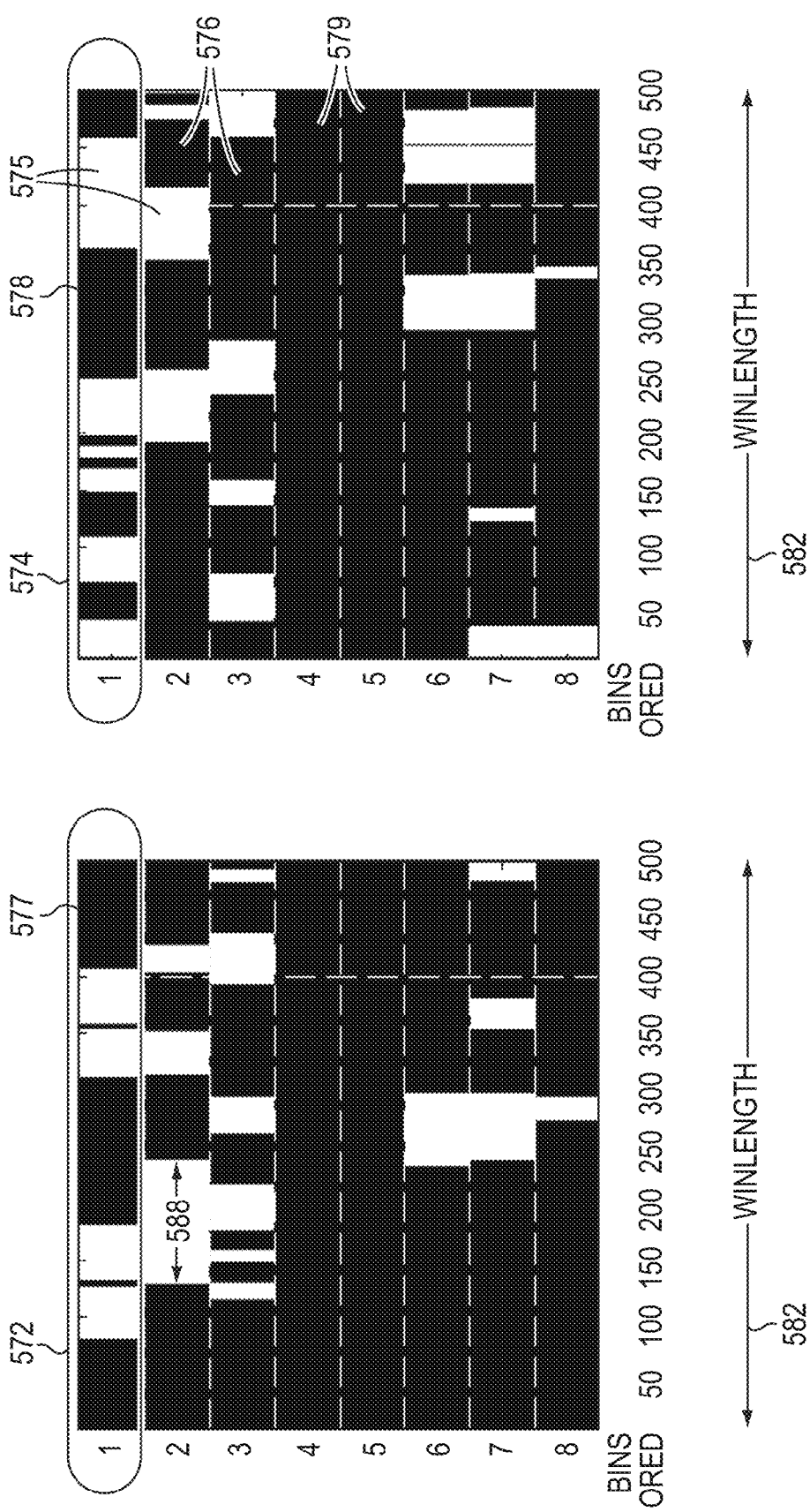

SPEED SENSOR

RELATED APPLICATION

This application is a continuation-in-part of U.S. application Ser. No. 13/673,818, filed Nov. 9, 2012. The entire teachings of the above application are incorporated herein by reference.

BACKGROUND

Speed sensors that rely on reflection of waves from objects may rely upon pattern-recognition techniques to determine the distance that a reflecting object and the speed sensor are displaced with respect to one another in a given time.

A specific example from the marine industry is a sonar speed sensor that is designed with two transmitter-receivers. Sonar signals can be transmitted from acoustic transmitter-receivers, reflected from objects or particles in the water, detected by each transmitter-receiver at different times, and then analyzed to look for changes in the reflection pattern and thus determine a relative displacement of a marine vessel with respect to the water with time. In particular, the pattern analysis has been done using cross-correlation and difference methods to compare data sets from the two transmitter-receivers.

SUMMARY

One drawback of the marine sonar speed sensor example given above is that it is difficult to distinguish reflections from particles from spurious signals and reflections from larger objects such as a seabed or lakebed. Electronic noise may also create a problem in the pattern recognition. Further, the technique may not determine reliable speeds under conditions of either higher or lower speeds. Additional problems include that speed data may become unreliable when there are too many or too few particles in the water, and cross-correlation techniques can be very computation-intensive.

The present invention relates to speed sensors and methods of speed sensing that can achieve greater reliability and speed range by distinguishing signals reflected by individual particles from signals due to noise and background.

In one aspect, a method includes generating, by a first receiver, a first plurality of signals, each of the first plurality of signals being related to an intensity of reflections received from a first monitored region containing one or more particles. The first plurality of signals are sampled to produce a first plurality of sampled values, and the first plurality of sampled values are processed according to a particle detection scheme to determine a relative speed of one of the first receiver and the particles with respect to the other. The particle detection scheme may include filtering out long-duration electronic spikes, using an exponential smoothing process. The first plurality of sampled signals may be quantized with binary 1s and 0s to represent detection or lack of detection of particles. Speed measurement may include counting a number of transmitted pulses during which a particle is detected in the first monitored region. The method may also include detecting a displacement of a surface from the first receiver.

In a second aspect, a system includes a first receiver for generating a first plurality of signals, wherein each of the generated first plurality of signals is related to an intensity of reflections received from a first monitored region containing one or more particles. A sampling circuit samples each of the first plurality of signals to produce a first plurality of sampled values, and a processing device processes the first plurality of sampled values according to a particle detection scheme to determine a relative speed of one of the first receiver and the particles with respect to the other. The system may be extended to measure speeds in other dimensions by including additional receivers.

In a third aspect, a system includes a first receiver for receiving a plurality of signals, wherein each of the plurality of received signals is received at a different time and has a magnitude related to a strength of a reflection received from a particle. A sampling circuit samples each of the plurality of signals and stores a corresponding value in a memory device, resulting in a plurality of stored values, and a processing device calculates a relative speed between the first receiver and the particle based upon the plurality of stored values.

In a fourth aspect, an apparatus includes a transducer for sending a transmitted signal and receiving a first return signal at a first time and a second return signal at a second time, each of the first and second return signals having a characteristic that varies with position of the marine vessel and the transducer having a field of detection. A filter removes unwanted background from the return signal to produce a filtered signal, and a measuring device measures a distance between two positions based upon a time difference between the first time and the second time.

In a fifth aspect, a method for measuring a speed includes sending a transmitted sound signal using a transducer having a detection span. A signal is received that results from a particle reflecting at least a portion of the transmitted signal, where the reflection then impinges on the transducer. The resulting signal is filtered to produce a filtered signal indicating the particle's presence. A time between the particle's entering and leaving the detection span of the transducer is measured to devise a speed.

In a sixth aspect, a system includes a speed sensor configured to operate in a high frequency range and to output a first depth within a small depth range. A depth sensor is configured to operate in a low frequency range and to output a second depth within a large depth range, and the depth sensor is further configured to work in conjunction with the speed sensor. A processing device is configured to receive at least one of the first depth and the second depth and to output a measured depth within a range covering at least the small depth range and the large depth range.

In some embodiments, corrections can be applied to determined speeds. Corrections to speed measurements made according to the particle detection scheme using one or more receivers can be based on a known relationship between particle-based speed measurements made using one or more receivers according to the particle detection scheme and either (i) cross-correlation-based speed measurements or (ii) speed measurements from a reference device. Speed measurements based on cross correlation can be corrected based on a known relationship between cross-correlation speeds and speed measurements from a reference device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5E shows data derived from the Fore transducer similar to those in FIG. 5D after representing the data by binary values, reducing redundancy of the data, and combining into depth zones.

FIG. 5F shows data similar to those in FIG. 5E, but corresponding to the Aft transducer

DETAILED DESCRIPTION OF THE INVENTION

A description of example embodiments of the invention follows.

Figure 1:
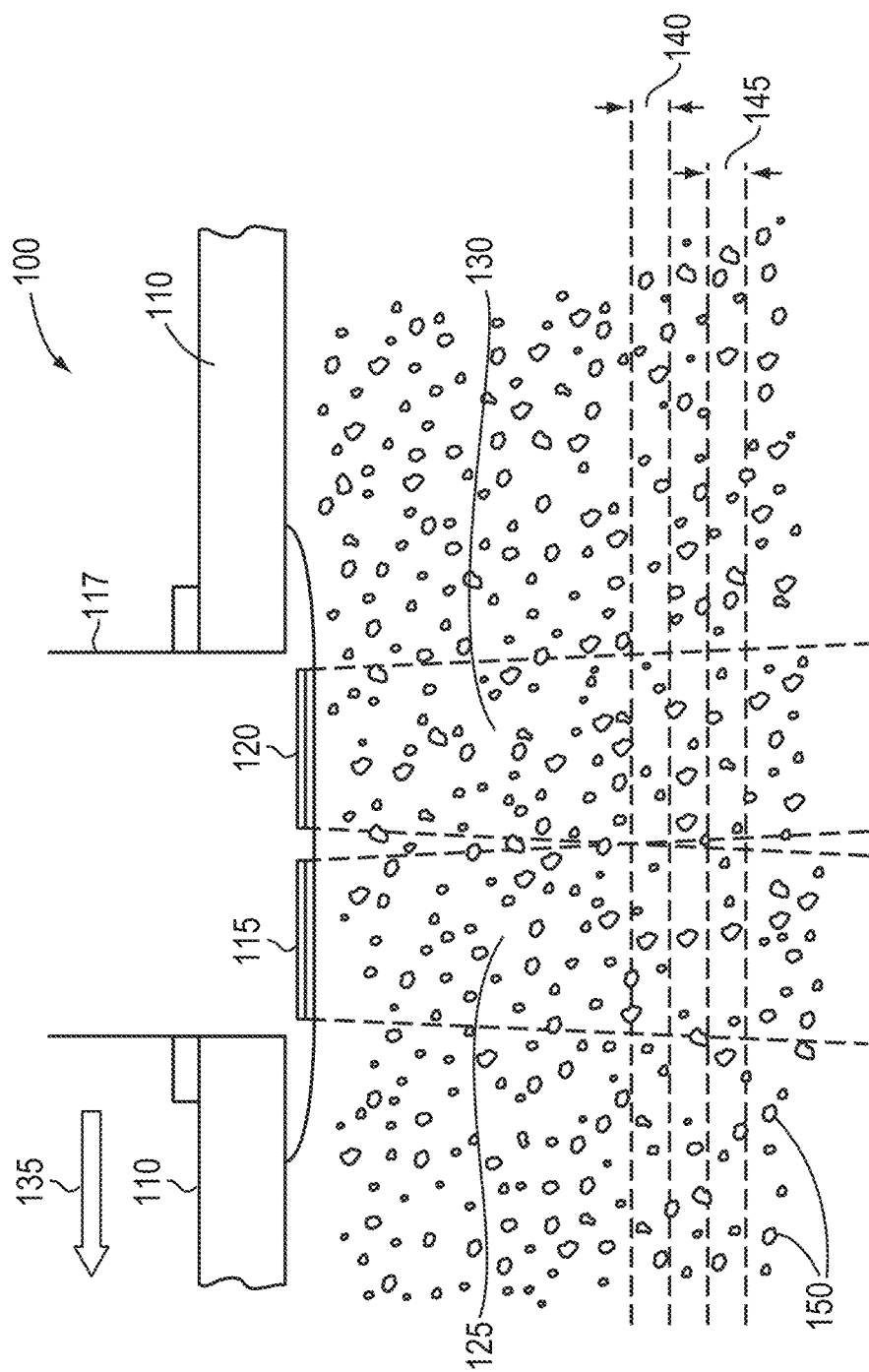
FIG. 1 is a schematic cross-section view of an embodiment having two receivers that monitor a region containing reflective particles.

FIG. 1 shows an embodiment 100 where a first ultrasonic receiver 115 and second ultrasonic receiver 120 are positioned on a motion axis (arrow 135) of a vessel 110, such as a boat hull, for detecting the relative speed of the receivers (and hence the boat) with respect to random particles 150 located in water. These ultrasonic receivers may also be called ultrasonic transducers, or simply transducers. The receivers 115 and 120 may also be configured to transmit ultrasonic signals, which are also called ultrasonic pings or simply pings, or the transmitted signals could originate from components other than the receivers. Receiver 115 may also be referred to as a "Fore" or "F" receiver for convenience. Receiver 120 may similarly be referred to as an "Aft" or "A" receiver.

The random particles 150 partially reflect the ultrasonic signals, or ultrasonic pings, from the respective first and second receivers 115 and 120. Ultrasonic pings are typically transmitted from each respective transducer at the same time, while transducers are appropriately spaced to reduce cross-talk.

In addition to generating signals such as pings, first receiver 115 and second receiver 120 also detect respective reflections from the randomly located reflective particles 150, generating respective first and second pluralities of signals. Each signal of the first and second pluralities of signals is related to the intensity of reflections received from the particles in the respective monitored region. Reflective particles 150 may include bubbles, plankton, seaweed, small parts of other plants or animals, sand particles, dust particles, small pieces of debris, or other small objects.

Sampling within each depth range 140, 145 is controlled by precise time-sampling of reflection signals for each respective receiver 115, 120 following an ultrasonic ping. For example, each transducer generates an ultrasonic beam 125, 130 that is directionally transmitted beneath vessel hull 110 as shown. The ultrasonic signals travel at a known speed through the medium in which randomly located particles 150 are suspended. Reflections from the randomly located particles 150 also travel at or near an ultrasonic speed back to the respective receiver 115, 120. Accordingly, each ultrasonic receiver 115, 120 generates signals at the appropriate time intervals following a transmit signal to properly monitor a depth range such as depth range 140 or depth range 145.

While two receivers 115 and 120 are shown in the embodiment 100 in FIG. 1, one receiver is sufficient to determine speed in some embodiments. Even in embodiment 100, individual speeds may be determined based upon the respective receivers 115, 120, in addition to speeds determined by processing the first and second pluralities of data in conjunction with each other.

Figure 2:
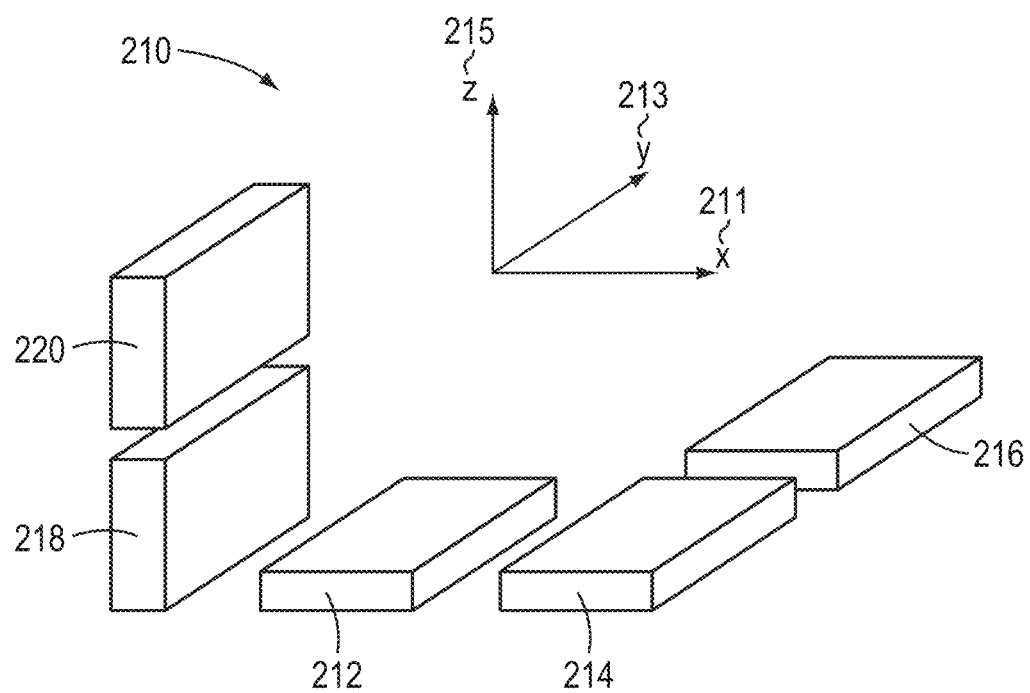
FIG. 2 is a perspective drawing showing five receivers arranged so as to measure speed in three dimensions.

Some embodiments may use more than two receivers to provide additional data. FIG. 2, for example, shows an embodiment 210 with five receivers 212, 214, 216, 218, and 220. In embodiment 210, receivers 212 and 214 may be considered as first and second receivers that monitor respective first and second monitored regions. Using receivers 212 and 214, a speed may be determined in the direction of the X axis 211 shown. Receiver 216 is in the same plane (the X-Y plane defined by directions 211 and 213) as receivers 212 and 214, and receiver 216 may be considered to be a third receiver having a third monitored region. Receiver 216 generates a third plurality of signals, and each of these signals is related to the reflections received from a third monitored region. Any motion component of the receivers in the Y direction 213 may be measured by, for example, processing the second and third pluralities of sampled signals in conjunction with each other according to the particle detection scheme. With receivers 212, 214, and 216, a two-dimensional speed in the X-Y plane may thus be determined. An axis formed by receivers 212 and 214 is perpendicular to an axis formed by receivers 214 and 216. In other embodiments, these axes may not be perpendicular. Similarly, receivers 218 and 220, which are non-coplanar with the plane formed by receivers 21, 214, and 216, are used to determine a speed in the Z direction 215, giving embodiment 210 the ability to fully determine a three-dimensional speed. In other embodiments, only four receivers may be used to fully determine a three-dimensional speed.

In embodiments with three receivers, the third receiver may be oriented collinearly with the first and second receivers, providing for additional speed data or accuracy by processing additional combinations of pluralities of sampled signals in conjunction with each other. In such embodiments, with collinear receivers, the first, second, and third receivers may be equally or unequally spaced.

In some embodiments, a light detector may be used instead of an ultrasonic transducer to receive signals reflected from a region containing particles. Further, the signals received may be light signals. The particle detection scheme may be similarly applied to the case of light receivers.

Figure 3:
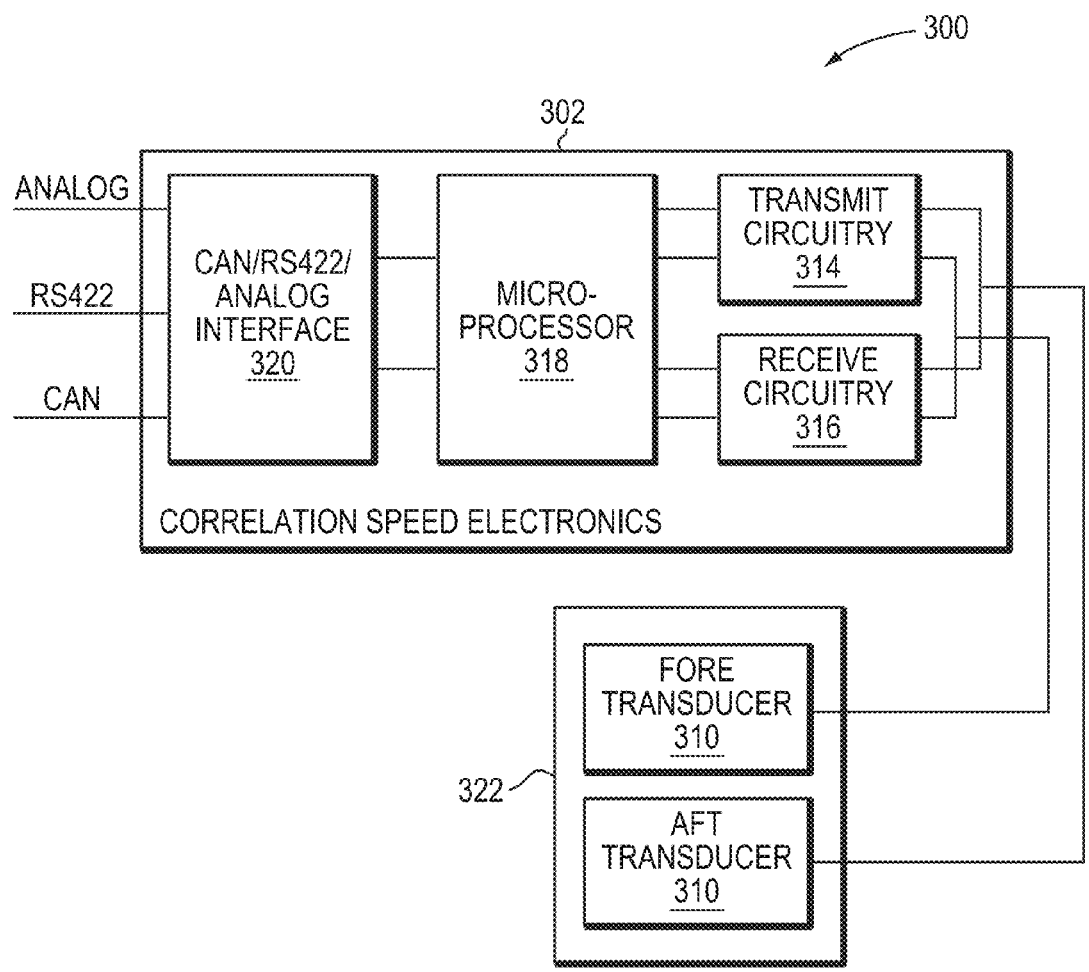
FIG. 3 is a block diagram of a one-dimension speed sensor system.

FIG. 3 is a system block diagram of a speed sensor 300. Speed sensor 300 includes two transducers, FORE transducer 310 and AFT transducer 312 in a single housing 322. While speed sensor 300 includes two transducers in the same housing, transducers may be in separate housings in other embodiments. Correlation speed electronics 302 include transmit circuitry 314 and receive circuitry 316, to which both transducers 310 and 312 are connected. The transmit circuitry 314 is configured to drive the transducers to transmit signals when the transducers are operating in transmit mode, and the receive circuitry 316 is configured to sample a plurality of signals generated by each transducer when operating in receive mode. The receive circuitry 316 includes one or more analog-to-digital converters (ADCs) for sampling the generated signals. Microprocessor 318 processes the sampled signals and performs speed calculations. Microprocessor 318 may also filter sampled signals in various ways and may thus be considered to include an electronic filter. Speed sensor 300 also includes an interface 320 for controller area network (CAN), RS422, and analog communications.

Figures 4A, 4B:
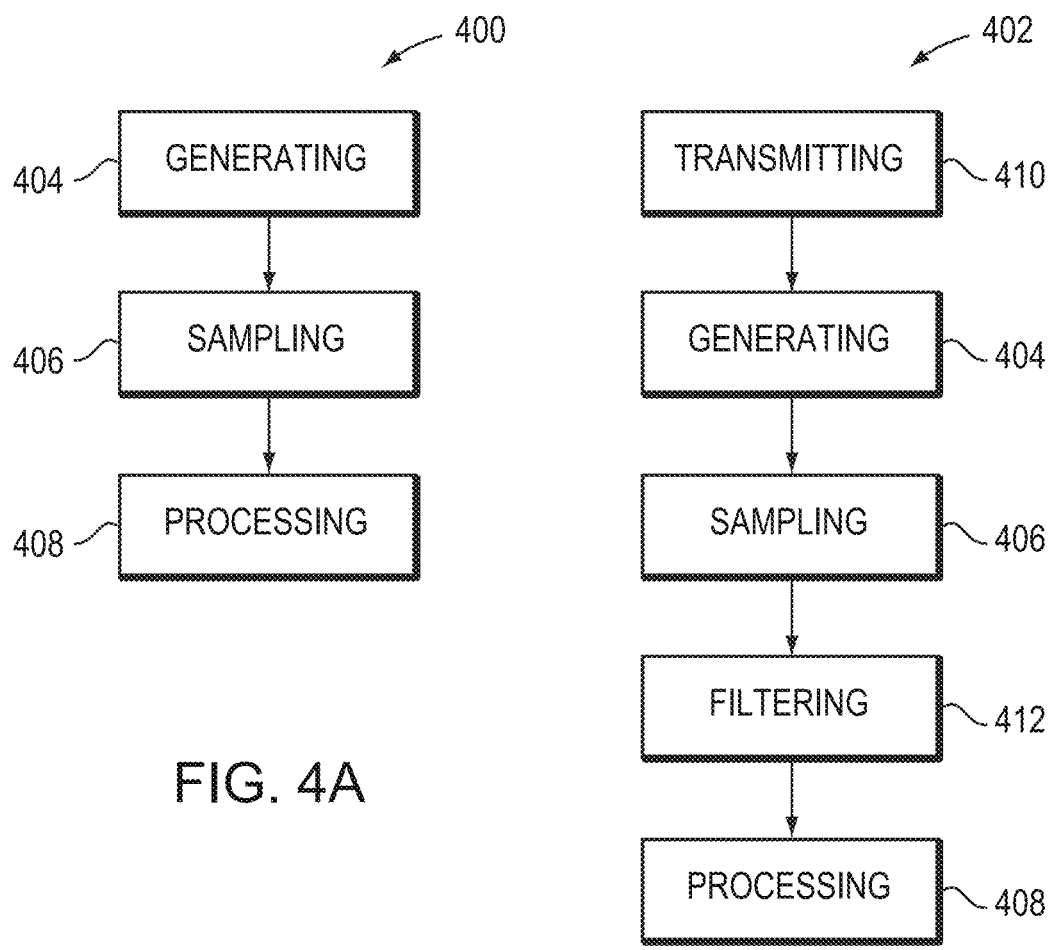
FIG. 4A is a flow diagram illustrating a method of determining the relative speed of a receiver with respect to one or more particles.
FIG. 4B is a flow diagram illustrating a method of determining the relative speed of a receiver with respect to one or more particles, including transmitting and filtering steps.

FIG. 4A is a flow diagram illustrating a method of determining the relative speed of a receiver with respect to one or more particles. The general method consists of a generating step 404, a sampling step 406, and a processing step 408. As to generating, a first receiver generates a first plurality of signals, and each signal of the first plurality of signals is related to an intensity of reflections received from a first monitored region containing one or more particles. Each of the first plurality of signals is sampled by a sampling circuit to produce a first plurality of sampled values, and the sampled values are then processed according to a particle detection scheme to determine a relative speed of the first receiver with respect to the particles. Speed measurement may include counting a number of transmitted pulses or received signals for which a particle is detected in the first monitored region.

The particle detection scheme permits distinguishing individual particles from background signals, electronic noise, surface reflections, and the like. The particle detection scheme may include any one of the following or a combination thereof: filtering out long-duration electronic spikes; filtering background using an exponential smoothing process; filtering by estimating or calculating a pseudomedian background value; filtering by detecting or removing reflections from surfaces or large objects; quantizing sampled signals and/or assigning sampled signals binary 1s and 0s to represent detection or lack of detection of particles; and further processing of the quantized or binary data such as reduction. Sampled values are thus processed according to this scheme to determine a speed if the speed is calculated from the sampled signals after they have been processed using one or more of the above techniques.

A speed, or a relative speed, of the first receiver with respect to the particles means that the speed is relative and could be a negative value. Thus, even if the first receiver is considered to be stationary and the particles are considered to be moving, the method 400 works the same. Stated in other words, the determined speed is a speed of either the first receiver with respect to the particles or of the particles with respect to the first receiver.

FIG. 4B is a flow diagram illustrating an alternative method of determining the relative speed of a receiver with respect to one or more particles, according to an embodiment 402. The method 402 includes transmitting 410 a particle detection pulse in order to cause the reflections that are received from the first monitored region. As explained previously, the transmitting and generating are typically performed by a single ultrasonic transducer. Method 402 also includes filtering the first plurality of sampled values prior to the processing 408.

Figure 4C:
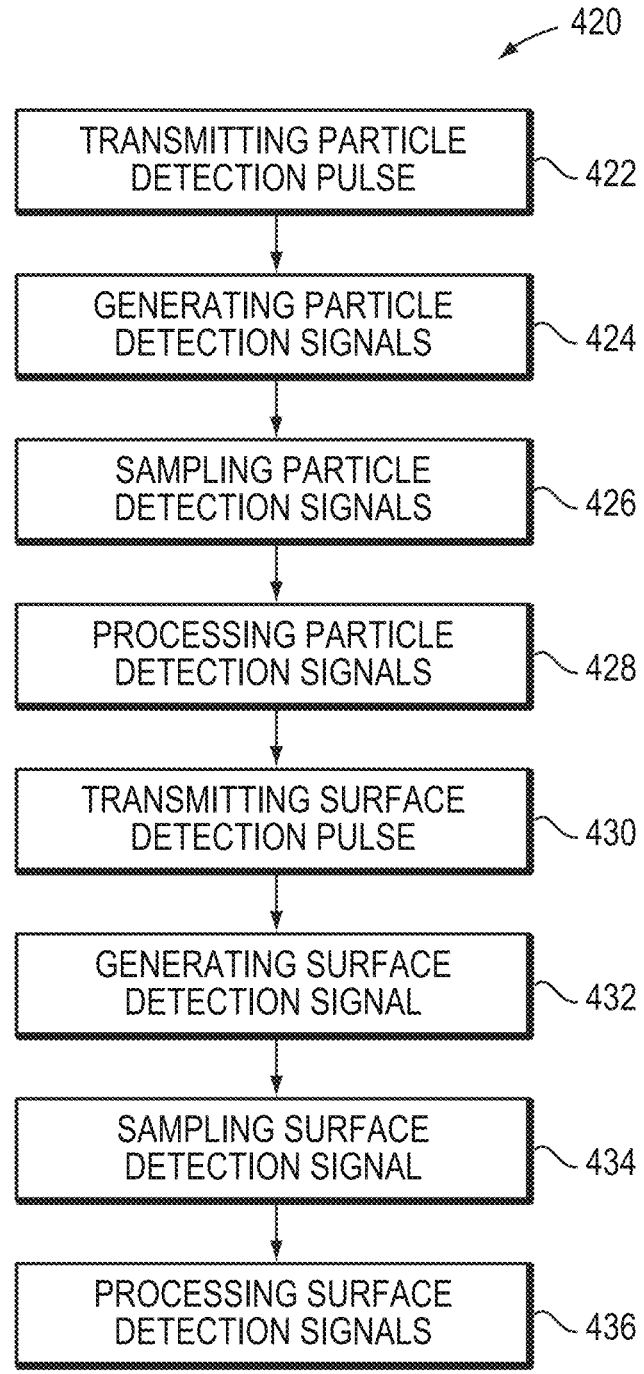
FIG. 4C is a flow diagram illustrating a method of determining both the relative speed of a receiver with respect to one or more particles and the displacement of a surface from the receiver.

FIG. 4C is a flow diagram illustrating a method 420 of determining both the relative speed of a receiver with respect to one or more particles and the displacement of a surface from the receiver, according to an embodiment. Steps 422 (Transmitting particle detection pulse), 424 (Generating particle detection signals), 426 (Sampling particle detection signals), and 428 (Processing particle detection signals) are similar to the Transmitting, Generating, Sampling, and Processing steps in FIG. 4B. However, method 420 further includes steps to determine the displacement or distance of a surface from the receiver. In step 430, a surface detection pulse is transmitted by transducers 310, 312, and in step 432, a surface detection signal is generated at transducers 310, 312 based on reflections received from the surface. The surface detection signal may also be called a surface reflection signal. In step 434, the surface detection signal is sampled to produce a sampled surface detection signal or sampled surface reflection signal, and in step 436, the sampled surface detection signal is processed to determine the distance of the surface from the receiver. Method 420 shows the particle detection steps preceding the surface detection steps; however, these steps may be carried out in any convenient order. Method 420 is applicable to any fluid (gas or liquid) that can potentially contain particles and surfaces.

Method 420 may be applied readily in the context of speed and depth sensing for a water vessel. The particles may include the items already described, the surface may be the water bed, and the displacement or distance may be the depth of the water bed from the receiver. Embodiments of the invention, therefore, are useful for both speed detection and depth measurement. Depth detection pulses may be transmitted infrequently (e.g., every five seconds) and interspersed with particle/speed detection pulses at convenient times. In fact, depth detection pulse transmission, as well as generating and sampling depth detection signals may be very similar to particle detection, with one difference being how the sampled signals are processed.

The depth resolution of the system may be determined in part by the length of the depth detection pulse. For example, in the case of a pulse of 22 cycles (16-cycle pulse transmission plus 6-cycle ring down) at a 4.5 MHz frequency, the duration of a transmitted pulse (or generated signal) is $22/(4.5 \times 10^{-6})$, or 4.89 microseconds. For a pulsed sonar, resolution=s*tau/2, where s is the speed of sound in the fluid, tau is the pulse duration, and the division by 2 is to account for the round trip distance to the bottom and back. Assuming a nominal s=1500 m/s for fresh or salt water, and tau=4.89e-6 seconds, the depth resolution is 3.67 mm. The significance of 3.67 mm is that a smooth bottom depth can be measured to an accuracy of about 4 mm.

The depth measurement range of most sonar systems is empirically constrained by the energy formula alpha×depth=10 dB, where alpha is the attenuation constant for the sonar frequency used, and depth is in meters. At a transmission frequency of 4.5 MHz, alpha is approximately 5 dB/m, so the useful depth range is about 2 m at this frequency. A consequence is that a water speed sensor operating at 4.5 MHz and with 22-cycle transmission has a depth measuring capability of up to 2 m and a measurement accuracy of 4 mm. The pulse duration of 4.9 microseconds also relates to the minimum depth that can be measured with a device with these parameters. The pulse duration is also the receiver blanking period, the time during which the receiver cannot receive while transmission and ring down are occurring. Doubling the blanking time to about 10 microseconds, coupled with applying the s*tau/2 formula, yields an estimate of the smallest depth that could be measured, about 7.3 mm. Thus, a speed sensor with these parameters may also be useful to augment a general purpose, lower-frequency sonar depth measuring device that can measure, for example, depths of 1-500 m, but cannot measure smaller depths and cannot measure with high accuracy such as 4 mm.

Figure 4D:
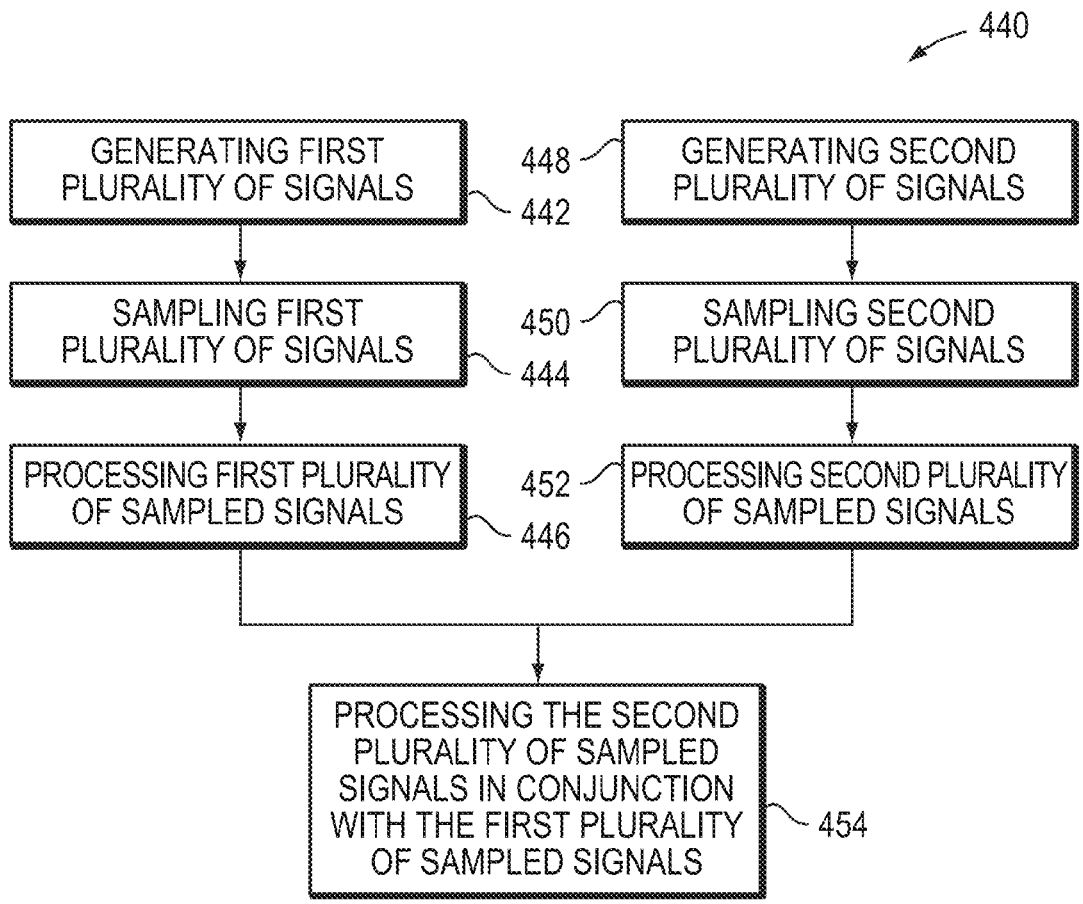
FIG. 4D is a flow diagram illustrating a method of determining both speeds of two individual receivers and a speed of the combination of the two receivers with respect to one or more particles.

FIG. 4D is a flow diagram illustrating a method 440 of determining the respective, relative speed of each of two individual receivers and a relative speed of the combination of the two receivers with respect to one or more particles, according to an embodiment. Steps 442, 444, and 446, which apply to the first receiver, are similar to the steps in FIG. 4A for a single receiver. In method 440, similar steps 448, 450, and 452 apply to the second receiver. In this embodiment, these steps are shown in parallel to those for the first receiver, but they could also be performed sequentially or interspersed with each other in various ways. Method 440 concludes with a step 454 of processing the second plurality of sampled signals in conjunction with the first plurality of sampled signals according to a particle detection scheme to determine a relative speed of the combination of the first and second receivers with respect to a subset of particles. The second receiver may be able to detect only a subset of the particles detected by the first receiver, so only the subset is relevant when processing the first and second pluralities of sampled signals with respect to each other to determine a relative speed of the combination of receivers. In other embodiments with additional receivers, other subsets are similarly relevant.

Figure 5A:
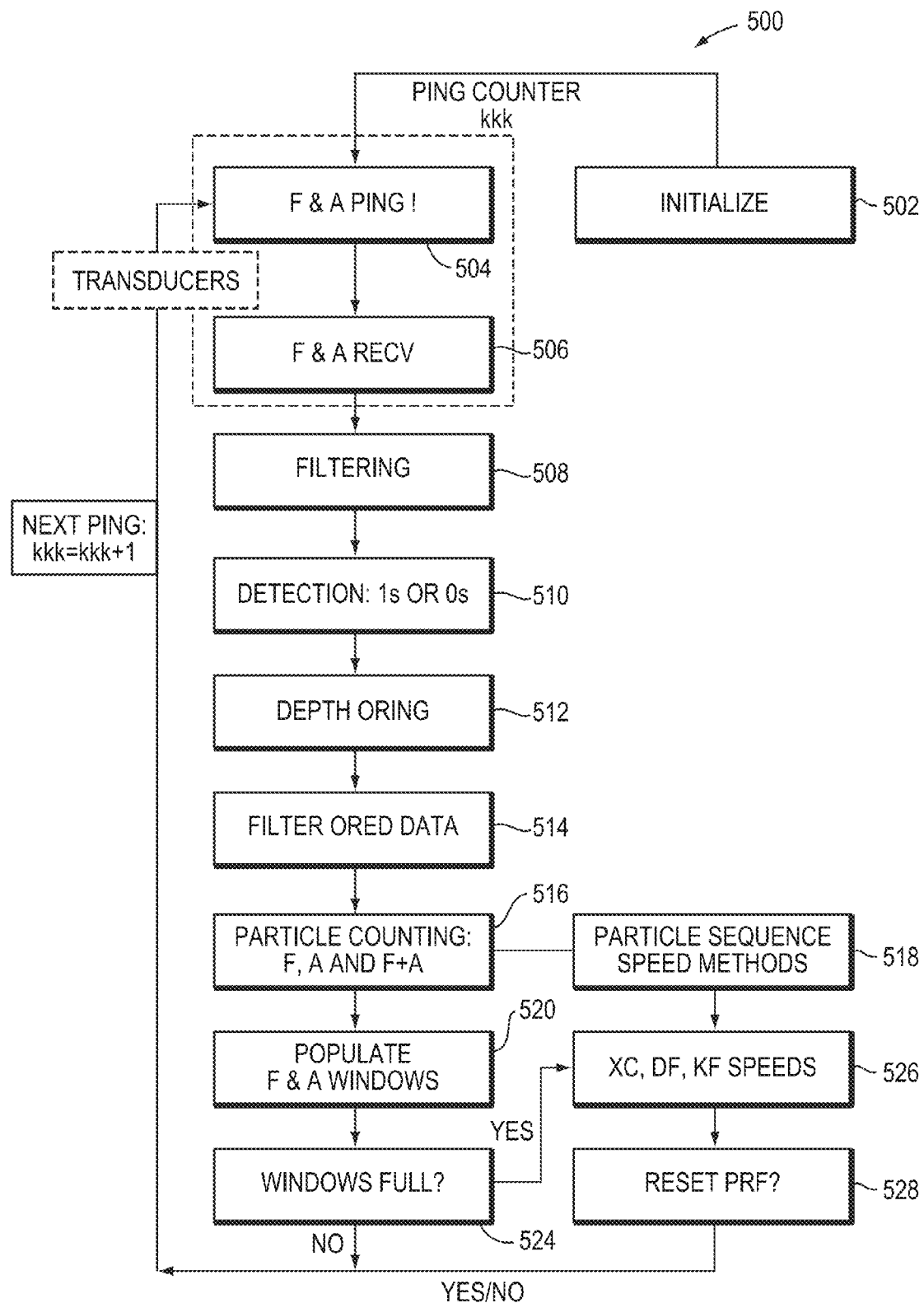
FIG. 5A is a flow diagram illustrating a method of determining relative speeds of receivers with respect to one or more particles.

FIGS. 5A-5H illustrate a preferred embodiment of a method for determining speed using two receiver/transducers, which also function as transmitters. FIG. 5A is a high-level flow diagram showing a top-level view of the method. At step 502 the process initializes, which includes setting a ping counter kick to 0. Step 502 may also include an equalization step to equalize the responses of the transducers. Step 504 includes "pinging," or transmitting a particle detection pulse. In this case, particle detection pulses are transmitted from both transducers simultaneously; however in other embodiments, pulses from two or more transducers may not be simultaneous. At step 506 the receivers receive, or generate respective first and second pluralities of signals, and the first and second pluralities of signals are also sampled to produce first and second pluralities of sampled values. At step 508 the sampled values are filtered to produce first and second pluralities of filtered sampled signals, which may include any of removing long-duration electronic spikes, estimating background, detecting any bottom reflections and exponential smoothing, and/or removing bottom reflections from the signals. These types of filtering are considered electronic filtering. At Step 510 particles represented in the pluralities of sampled, filtered signals are detected, and signals are assigned binary 1 to represent a detected particle and binary 0 to represent an absence of any detected particle. The binary data are reduced or mapped into 8 depth zones, or depth categories, at step 512. The reduced data are filtered at step 514 to exclude outliers in a set of reduced data. At step 516 the number of particles is counted to provide feedback to the data reducing step 512. Following the particle counting step 516, sequences of binary 1 values are counted at step 518 to determine speeds according to particle sequence methods of determining speed. At step 520 F & A windows are populated in preparation for cross-correlation and difference function analyses. According to step 524, if the correlation (or F & A windows) are not full, then the steps are repeated starting at step 504 on the next ping until these windows are full. Pings may occur at a rate, for example, of 4 kHz. On the other hand, if the correlation windows are full, then cross-correlation, difference function, and Kalman filter speeds are calculated at step 526. Following the speed calculations of step 526, the pulse repetition frequency (PRF) may be reset at step 528 as needed based on the calculated speed.

Figure 5B:
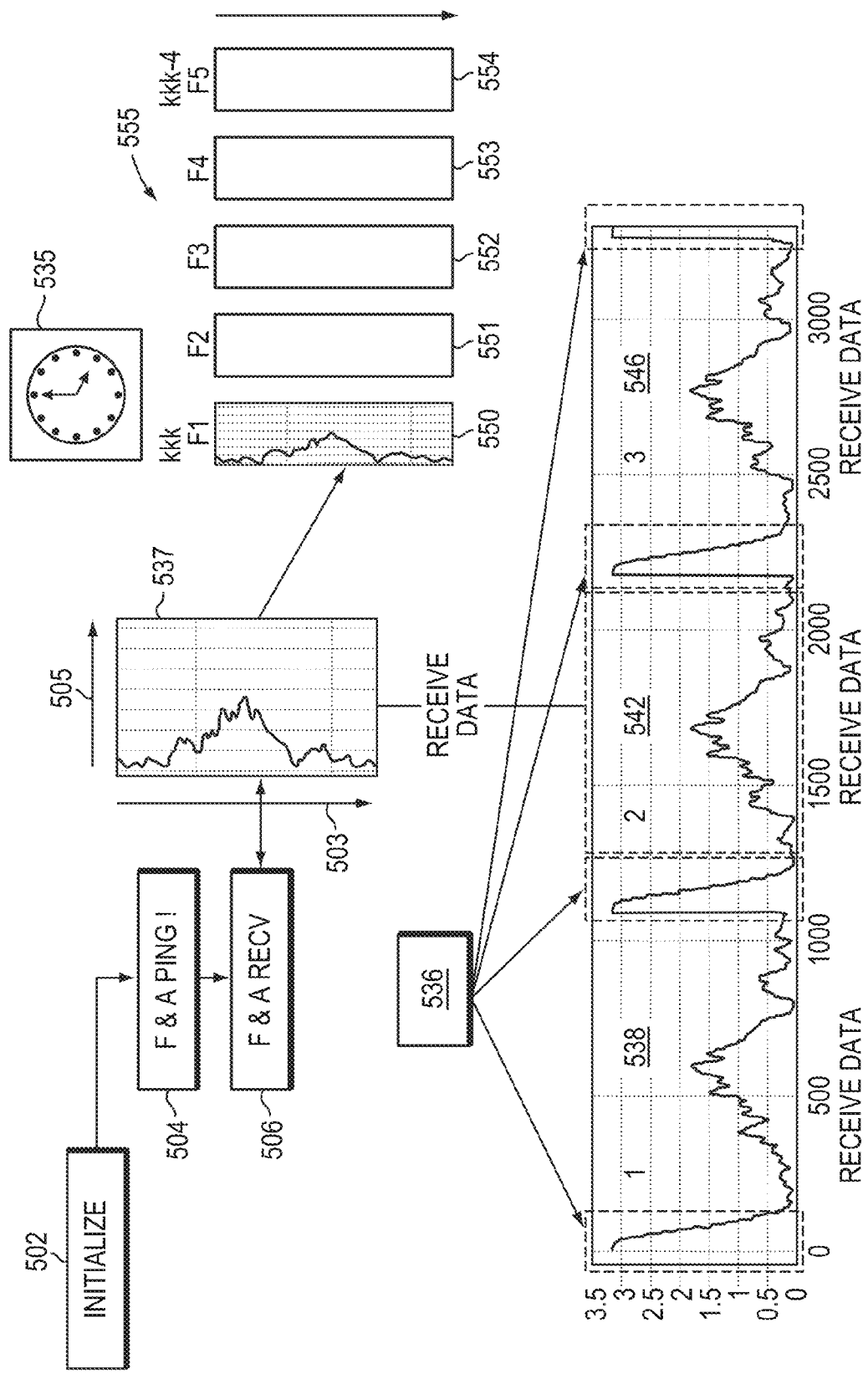
FIG. 5B is a block diagram showing elements and data involved in receiving and sampling.

FIG. 5B illustrates elements involved in step 506 in more detail. Step 506 includes generating, by the Fore and Aft transducers, first and second pluralities of signals. When sampled, the first and second pluralities of sampled signals are organized into data sets such as data set 537, which is associated with the Fore transducer. Data set 537 shows a sampled data set from the Fore transducer from a single ping. Data set 537 includes separate voltages separated by microsecond sampling intervals. The voltage at each microsecond interval represents the strength of reflection at a different time, and increasing time corresponds to increasing depth. Arrow 503 shows the time direction, and arrow 505 shows the direction of increasing signal level in volts. Each of these sampled signals is therefore associated with a measured depth among a set of possible measured depths and a measured time among a set of possible measured times. Because each data set such as data set 537 is associated with a different ping occurring at a different time, each sampled signal is further associated with a time among a set of possible measured times. Data sets may initially look like data sets 538, 542, and 546, except that the ring down regions 536, which result from the ping or signal transmission cycle of the transducer, are removed before further filtering or processing. Data set 537 is arranged into a storage buffer 555 capable of storing storage buffer time series 550, 551, 552, 553, and 554, also designated, respectively, F1, F2, F3, F4, and F5. The latest data set collected is inserted into buffer F1, and each data set is shifted to successive buffer time series F2, F3, F4, and F5 each time a new data set is received. The storage buffer 555 is used for filtering data from the Fore transducer, and there is a similar buffer for data from the Aft transducer. The buffer time series 550 (F1) corresponds to the latest ping index kkk. While storage buffer 555 includes space for five time series, other embodiments may include buffers with space for more or fewer than five time series.

Step 508 (FIG. 5A) includes filtering the first and second pluralities of sampled values to produce first and second pluralities of sampled, filtered values. Step 508 may include removing long duration electrical spikes in the data, estimating a pseudomedian background, detecting bottom reflections and using exponential smoothing, and removing bottom reflections. Each of these filtering techniques is described below.

Long duration electronic spikes are primarily found and removed by testing the F2 buffer time series, because each data set cycles through F2, and F2 is a convenient helpful position. Averages meanF1, meanF2, and meanF3 are found for the respective buffers F1, F2, and F3. Further, ExpSm (meanF2), an exponentially smoothed value of meanF2 is determined. Exponential smoothing is a known process whereby a new value may be forecast by assigning weights to previous values, the weights decreasing exponentially with age of the previous values. Here, meanF2 is monitored for each data set received into the F2 buffer time series, and ExpSm(meanF2) can thus be calculated. If meanF2>3*ExpSm(meanF2), then F2 data has long-duration electronic spikes. The F3 data may then be substituted for F2 (a "coasting" method). Alternatively, F2 may be replaced with pseudomedian data previously calculated according to the pseudomedian background method described below. MeanF2 is then recalculated. Long-duration spikes might also affect F3, so a similar replacement test and process may be used for F3.

The pseudomedian background method is used to estimate background noise. Median estimation is a very good way to find the background noise. The median is found by ordering the data into a list, from smallest to largest, and picking out the value in the middle of the list. The values of the data are used to order the list, but otherwise are not used in the calculation. So very large or very small values have no affect on the median value, unlike the case of average values, which can be profoundly affected by outlying values in a data set. Calculating the standard median may pose a problem because it requires ordering data, a computationally intensive process that may not be possible in a real-time system.

An approximately equivalent and computationally fast method is to calculate a pseudomedian background, which is illustrated by the pseudo-median background code below. In the code, $image_{kkk}$ is the value for a data point at a given time/depth for the data set of index kkk. Similarly, $backgnd_{kkk}$ is the background value for a data point at a given time/depth for the data set of index kkk. To estimate the pseudomedian background at each microsecond interval, example code is:

```
if imagekkk > backgndkkk-1 ,
    backgndkkk = backgndkkk-1 + step;
elseif imagekkk < backgndkkk-1 ,
    backgndkkk = backgndkkk-1 - step;
else
    backgndkkk = backgndkkk-1 + 0;
end
```

Two items are needed for this code to run effectively. The first is an initial value for the background. The first image sample is often used for the background, or a small average of N samples of image can be used; thus, at startup, the method may initially produce less reliable results, but the simplicity of the pseudomedian background estimation method outweighs any disadvantage. Second, the quantity "step" in the code is chosen to be a small number. In the case where the data values range from integers 0 to 1023, the smallest value for step is 1. Data values using floating point values (such as values from 0.000 to 3.300) can use a step of 0.001.

Figure 5C:
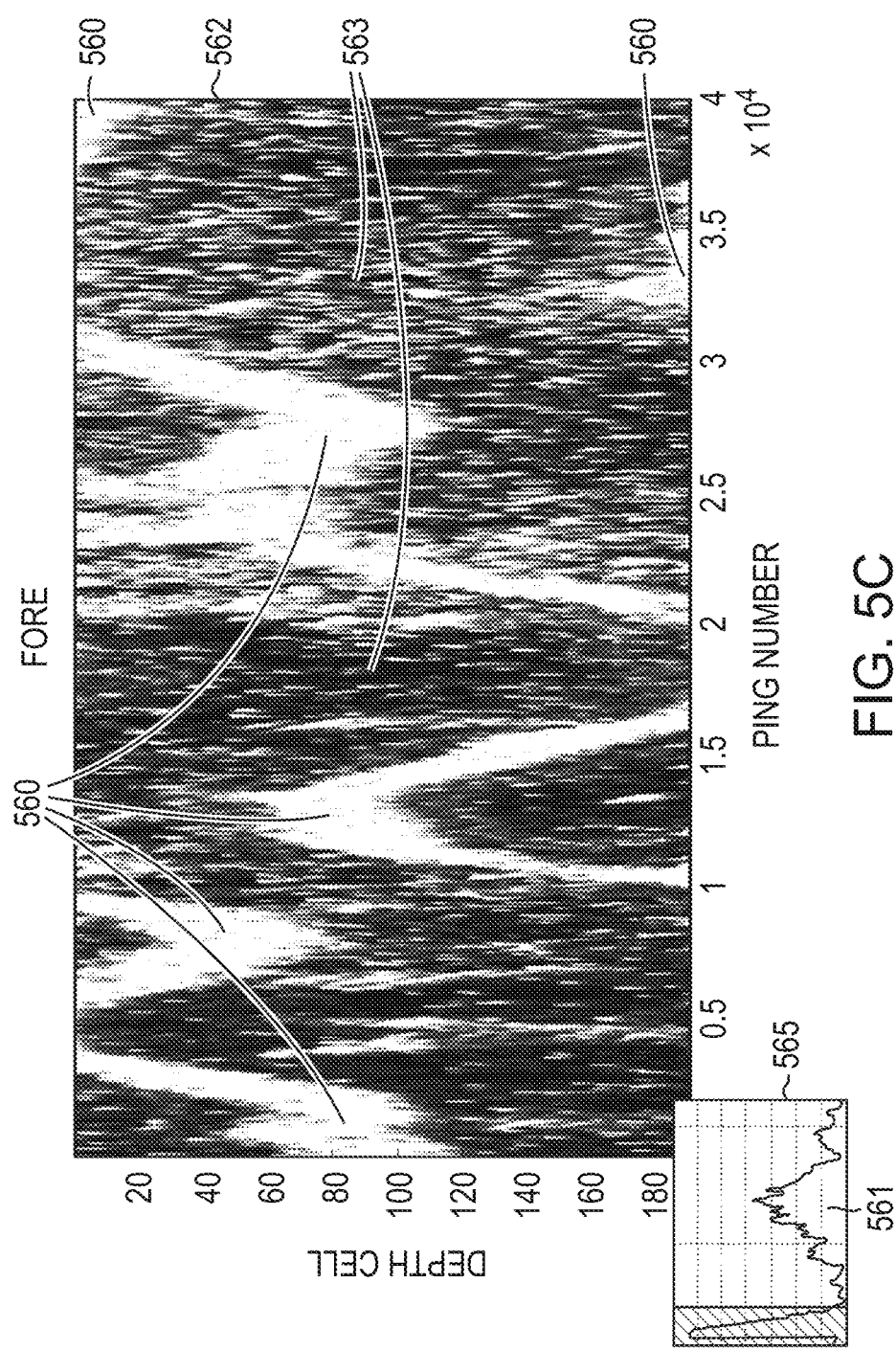
FIG. 5C is a graph showing a composite of data received and sampled over a 10 sec. period illustrating bottom reflections.

FIG. 5C illustrates a graph 562 showing a composite of 40,000 data sets similar to F1-F5 received and sampled over a 10 sec. period, illustrating bottom surface reflections 560. One such data set is shown in sub-graph 565. For each ping included in graph 562 in FIG. 5C, the corresponding data set is oriented vertically as in storage buffer time series 550-554 and arranged into a vertical line in graph 562, with lighter shades representing higher-voltage signals. Thus, bright spots such as those in 563 represent possible particle locations. Bottom surface reflections 560 correspond to data sets with bottom echoes, such as bottom echo 561 in the data set of sub-graph 565. Bottom echo 561 can be recognized by its broad peak. In graph 562, the signals produced by the bottom echoes vary in depth over time due to rolling motions of the boat on which the transducers are mounted. Surface reflections may also be produced by large objects such as fish or rocks.

Figure 5D:
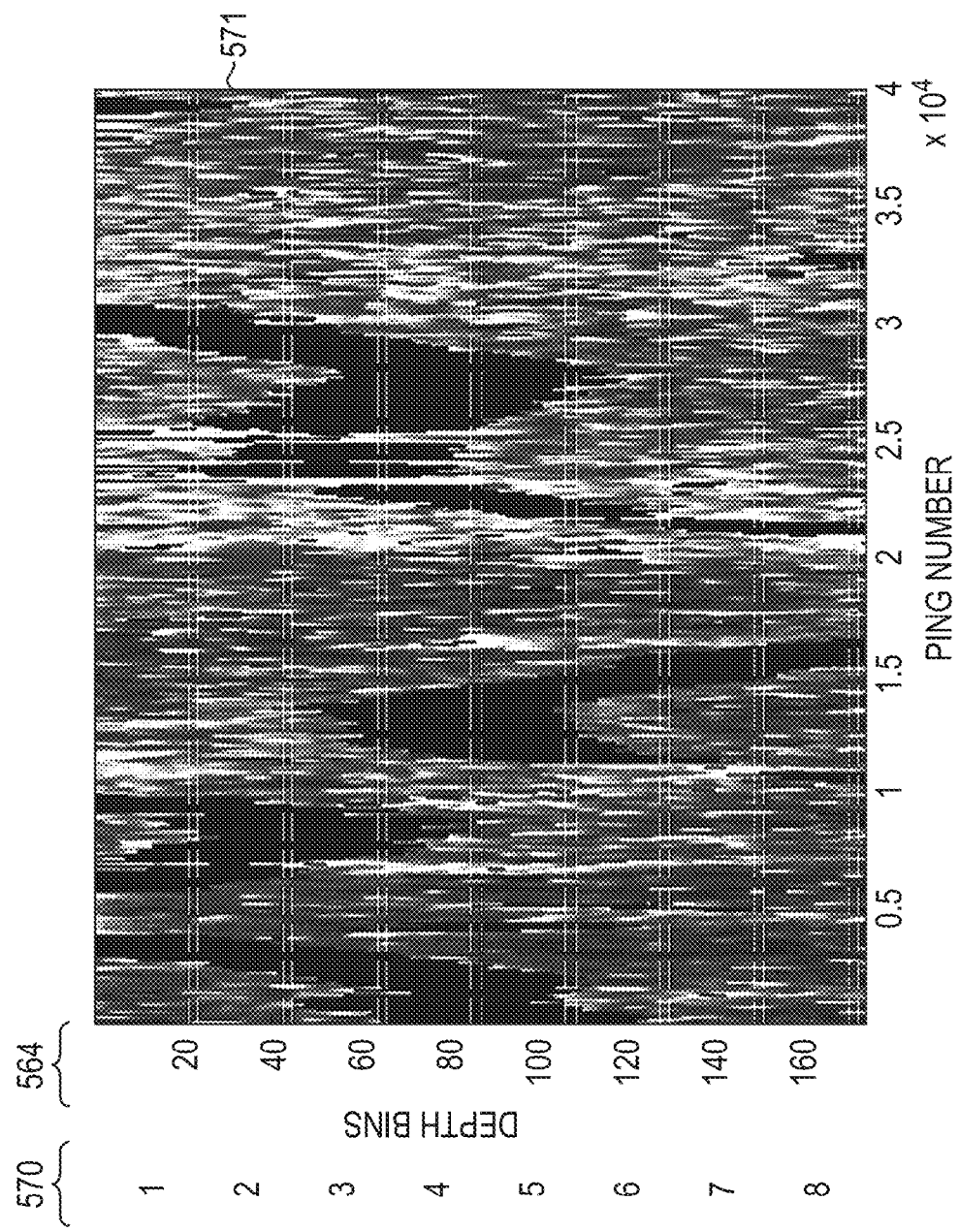
FIG. 5D is a graph showing the data of FIG. 5C after excluding bottom reflections and showing reduced depth zone categories.

FIG. 5D contains a graph 571 showing the data of FIG. 5D after excluding bottom surface reflections 560. FIG. 5D also shows reduced depth zones 570, to each of which a certain range of depth cells 564 corresponds.

Step 510 in FIG. 5A involves particle detection. Each depth cell in the sampled, filtered data of the F2 buffer time series is assigned a binary 1 if the voltage exceeds a given threshold representing particle detection, or a binary 0 if the voltage does not exceed that level. Each of these sampled, filtered, binary values, therefore, is associated with a measured depth among a set of possible measured depths, and a measured time among a set of possible measured times FIG. 5E, corresponding to data derived from the Fore transducer, shows data similar to those in FIG. 5D, after assigning binary values and reducing the data by combining depth cells into depth zones according to step 512 in FIG. 5A. FIG. 5F shows similar results corresponding the Aft transducer. FIG. 5E illustrates a Fore window 577, and FIG. 5F illustrates an Aft window 578. Each of the windows 577, 578 includes data collected from 512 pings (after ping counter kkk reaches 512 and the Fore window 577 and Aft window 578 are full). In other words, the window lengths 582, or winLengths, are 512 pings. Light spaces 575 represent binary 1s, or particle detections, whereas dark spaces 576 represent binary 0s, or absence of particle detection for that particular depth zone and ping. The censored zones 579 are excluded from further analysis in this case due to surface reflections being detected. Fore window 577 has a frame 572 (frame 1) covering the shallowest depth.

Step 512 in FIG. 5A includes reducing or "ORing" the data in depth for the data set from each ping kkk. This reduction greatly simplifies the computation required in further analysis. The simplest way to reduce the data is to divide the depth cells 564 into depth zones for each ping. A given depth zone for a given ping is assigned a binary 1 if at least one depth cell in the corresponding range of depth cells has a binary 1, or 0 otherwise. Preferably, however, this reduction is dynamic, or varied based on the number of particles detected. Dynamic data reduction is preferred because if there are too many particles detected, then the data become less useful. The optimum number of particle detections can be measured by sequence percentage, where sequence percentage=100%×(total binary 1s in a frame)/(window length). For example, the total number of 1s in frame 572 in FIG. 5E could be counted and divided by the window length in FIG. 5E, which is 512 pings. The sequence percentages are optimally between 0 and 40% for useful cross-correlation and difference function analyses. To adjust the sequence percentage, fewer depth cells 564 can be combined or ORed into each depth zone 570, and the remaining depth cells 564 can be excluded from further analysis.

Just as storage buffer 555 is capable of storing storage buffer time series from five pings, after reducing the data, a five-ping buffer of binary 0s and 1s. Step 514 in FIG. 5A includes further filtering the reduced or "ORed" data to exclude or modify outliers in a five-ping window of 0s and 1s. The binary assignment reducing scheme described above is an example of a quantization reducing scheme. Other types of quantization reducing schemes are also possible. For example, the quantization scheme may be based upon octal or hexadecimal numbers.

Figure 5G:
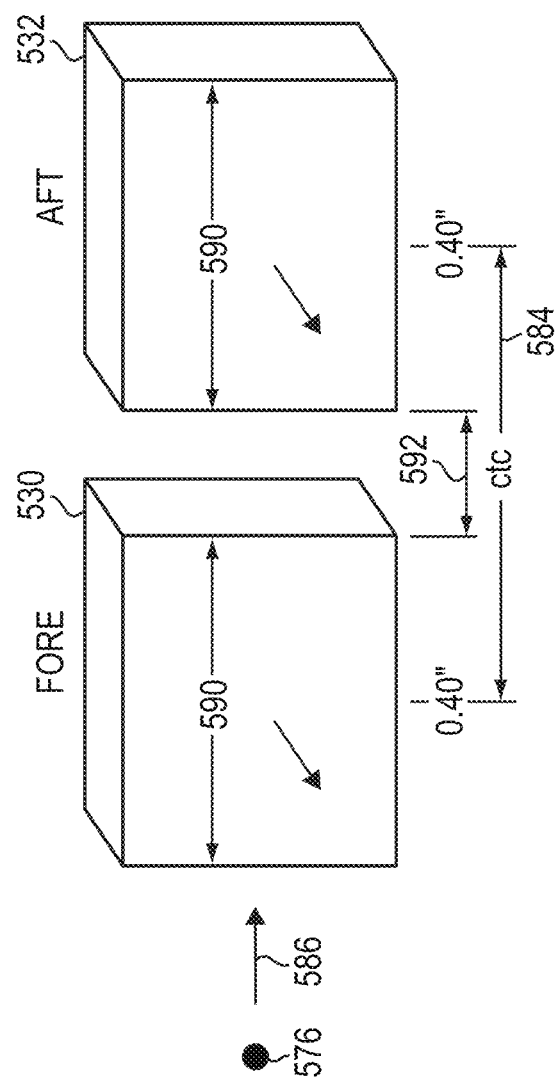
FIG. 5G is a block diagram showing dimensions of Fore and Aft transducer/receivers used to calculate speeds according to particle sequence methods.

FIG. 5G is a block diagram showing dimensions of Fore and Aft transducer/receivers used to calculate speeds based on particle sequence methods. In FIG. 5G, a particle 576 moves in a direction 586 of relative displacement of the transducers 530, 532 with respect to the particle 576. Each transducer has a dimension 590 in the direction of relative motion between the particle 576 and the transducers 530, 532. In this example, dimension 590 is 0.40 inches. The center-to-center (ctc) distance 584 between the Fore and Aft transducers is 0.44 inches in this case, and there is a gap 592 between the transducers.

Step 518 includes counting sequences of binary 1 values to determine speeds according to particle sequence methods of determining speed. In process 500 (FIG. 5A), there are three particle sequence speeds that may be determined: speedF, speedA, and speedFA. The speedF is calculated based on the number of pings for which the particle 586 is detected by the Fore Transducer 530. The speedF is calculated by the equation speedF=c×H×PRF/consec_ctsF, where c is a constant, H is a dimension of the first monitored region in a direction of relative displacement between the receiver and the particles, PRF is a pulse repetition frequency related to the generation of the first plurality of signals, and consec_ctsF is a number of sampled values for which a particular particle of the particles is detectable by the first receiver. In some embodiments, a dimension of the first monitored region in a direction of relative displacement between the receiver and the particles may be the same as a dimension of the receiver itself in that same direction; thus, in some embodiments, H is also a dimension of the first receiver.

In this case, c is a constant that converts meters per second into knots. H is the same as the dimension 590 of the transducers 530 and 532, because the dimension of the region monitored by the Fore transducer is nearly the same as the dimension 590 of the transducers themselves. PRF is the ping frequency, and consec_cts A is determined by starting a software counter when particle 576 is first detected by the Fore transducer 530 and counting pings until particle 576 ceases to be detected by the Fore transducer 530. An alternative way to visualize the speedF measurement is shown in FIG. 5E. The span 588 is the number of pings for which a particle is detected by the Fore transducer 530. The speedA is calculated in an analogous manner to that for speedF.

The particle sequence speed determined by the combination of data from transducers 530 and 532 is given by speedFA=c×((2×H)+gap)×PRF/consec_ctsFA, where c is a constant, H is a dimension of the first monitored region and of the second monitored region in a direction of relative displacement between the first and second receivers and the particles, gap is a distance between the first and second receivers, PRF is a pulse repetition frequency related to the generation of the first and second pluralities of signals, and consec_ctsFA is a number of sampled values in a set of sampled values beginning with a first sampled value for which a particular particle of the particles becomes detectable by the first receiver and ending with a last sampled value for which the particular particle is detectable by the second receiver.

Here, c and H are as previously explained for speedF and speedA. The gap of the above equation is the gap 592 in FIG. 5G. Consec_ctsFA is measured in a way that is somewhat different from that for consec_ctsF. Namely, a software counter is started when particle 576 is first detected by the Fore transducer 530, and pings are counted until particle 576 ceases to be detected by the Aft transducer 532.

Step 520 includes populating Fore and Aft windows 577 and 578 with each new set of reduced, filtered binary values corresponding to ping kick in preparation for cross-correlation and difference-function analyses.

When the Fore and Aft windows are full with data from 512 pings, then XC, DF, and KF speeds are determined in turn, according to step 526 in FIG. 5A.

Figure 5H:
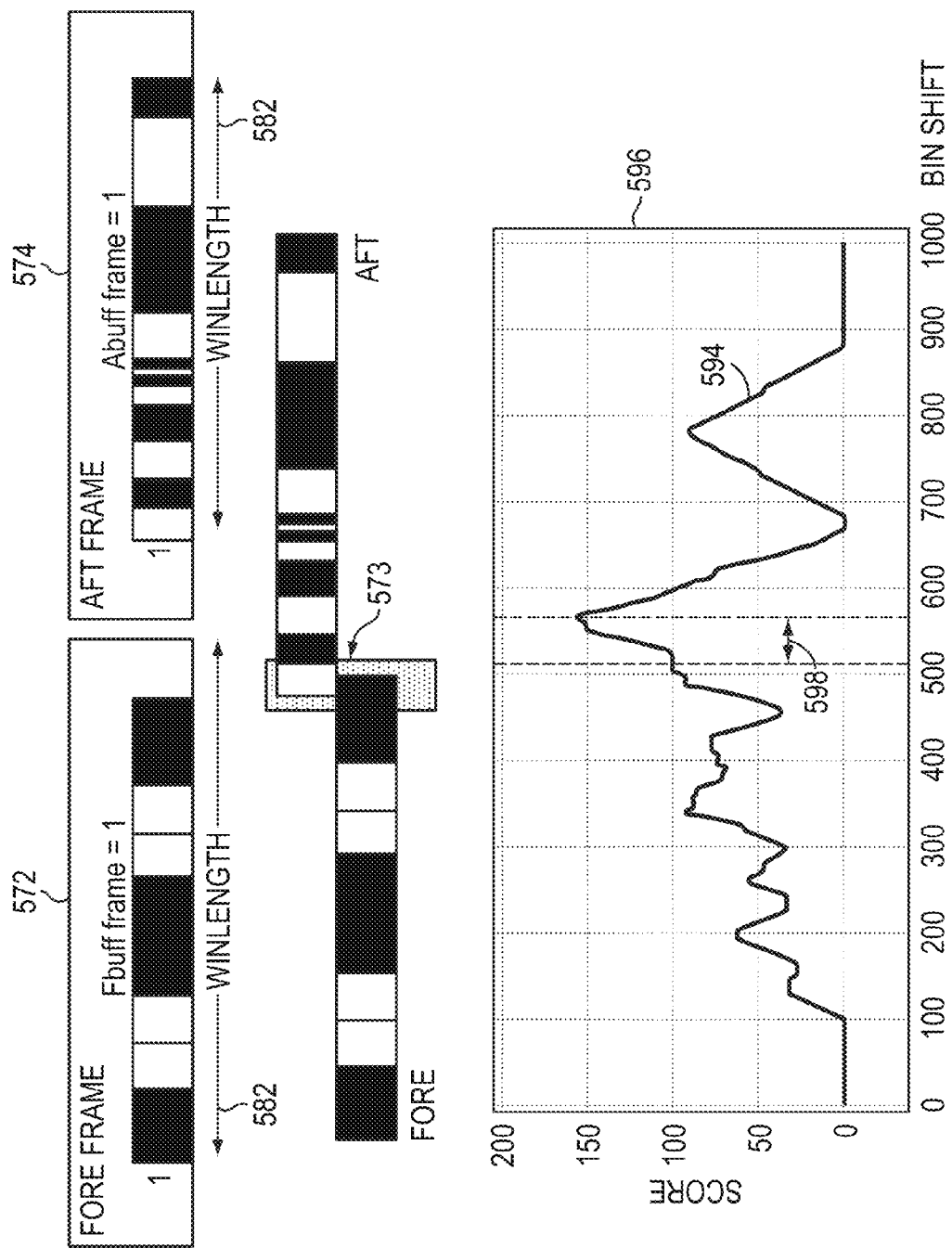
FIG. 5H is an illustration of a process of cross-correlating the reduced binary data.

FIG. 5H is an illustration of a process of cross-correlating the reduced binary data. Each frame in the Fore window 577 is cross-correlated with the corresponding frame in the Aft window 578. FIG. 5H illustrates, for example, cross-correlation (XC) of Fore frame 572 (Fore frame 1) and Aft frame 574 (Aft frame 1) from FIGS. 5E and 5F. The Fore and Aft frames are overlapped by one ping bin, the overlapped values are multiplied, and the answer is stored. The overlap 578 is increased by one bin, the overlapped values are multiplied, the multiplied values are summed, the answer is stored, and so on. FIG. 5H also shows a cross-correlation graph 596 of the XC function 594 at each bin shift. Bin shift is the number of bins by which the Fore and Aft frames are shifted with respect to one another upon beginning to overlap.

The cross-correlation speed (XCS) is calculated according to the equation XCS=c×ctc×PRF/peakXCoffset, wherein c is a constant, ctc is a center-to-center distance between the first and second receivers, PRF is a pulse repetition frequency, and peakXCoffset is an offset between a peak in XC and a center of an XC range. In this case, c, ctc, and PRF are as described above. An example peakXCoffset 598 is shown in FIG. 5H. The center of the XC range is 512, which is the same length as the window length 582, or winLength of each frame in the Fore and Aft windows 577, 578.

The difference function (DF) is another way to obtain a speed (DFS) based upon known correlation functions AC1, AC2, and XC, where AC1 is a Fore self-correlation function determined in the same way as for XC, except that each frame of the Fore window 577 is correlated with itself. AC2 is an Aft self-correlation function determined in an analogous way using only frames from the Aft window 578. DF is calculated according to the equation DF=AC1+AC2−z*XC to determine a Difference Function Speed (DFS) of the combination of the first and second receivers with respect to a subset of particles observed by both transducers. For perfect data, where the F and A transducers observe the same particles in exactly the same manner other than relative time delay, z is given by z=2.

In non-perfect cases, z may be given by two different expressions. Z may be given by z=(peak(AC1)+peak(AC2))/peak(XC), where peak(AC1) is a peak in the autocorrelation function AC1, peak(AC2) is a peak in the autocorrelation function AC2, and peak(XC) is a peak in the cross-correlation function XC. Alternatively, z may be given by z=(2×min(peak(AC1), peak(AC2))−XCctr)/estpeak(XC), where min(peak(AC1), peak(AC2)) is the smaller of the two values peak(AC1) and peak(AC2), XCctr is the center of the XC range, 512 in this case, and estpeak(XC) is an estimated location of a peak in XC.

The difference function speed (DFS) is calculated according to DFS=c×ctc×PRF/(z×zero_cross_offset), wherein c, ctc, and PRF are as described above, and zero_cross_offset is an offset between the zero crossing of the DF function and the center of the DF range (and XC range), which is 512 in this case.

Once speeds speedF, speedA, speedFA, XCS, and DFS are determined, or calculated, the speeds may be provided as input to a Kalman filter, which reports a best speed as an output. In other embodiments, any one of the measured speeds or any combination thereof may be provided as input to the Kalman filter, and the Kalman filter will report a based speed based upon the speed or speeds provided as inputs. Kalman filtering is a known technique, and here it provides another layer of robustness to speed reporting. In system 300 (FIG. 3), Kalman filtering may be implemented in microprocessor 318.

Step 528 includes resetting the PRF based upon, or selectively adapting it to, the calculated speed. This resetting may be for the purpose of adjusting the resolution of a speed measurement to a desired resolution. As an example of why this resetting is helpful, the cross-correlation speed XCS may be considered. XCS is calculated according to the equation XCS=c×ctc×PRF/peakXCoffset. The measured peakXCoffset may vary in discrete steps of 1 (peakXCoffset=6, 7, or 8, for example), because the window lengths 582 (FIGS. 5E, 5F, and 5H) are a number of pings. The effect of these discrete steps is to limit the resolution of measured speeds. However, the effect of the discrete steps on limiting resolution diminishes as peakXCoffset increases. Thus, since peakXCoffset increases proportionally with PRF for a given speed, PRF may be reset to achieve a desired resolution. Viewed in another way, peakXCoffset also increases with lower speeds for a given PRF, so PRF may be selected based upon speed. The PRF may also be reset based upon an estimated speed, such as a speed of 0 at startup.

Figure 5I:
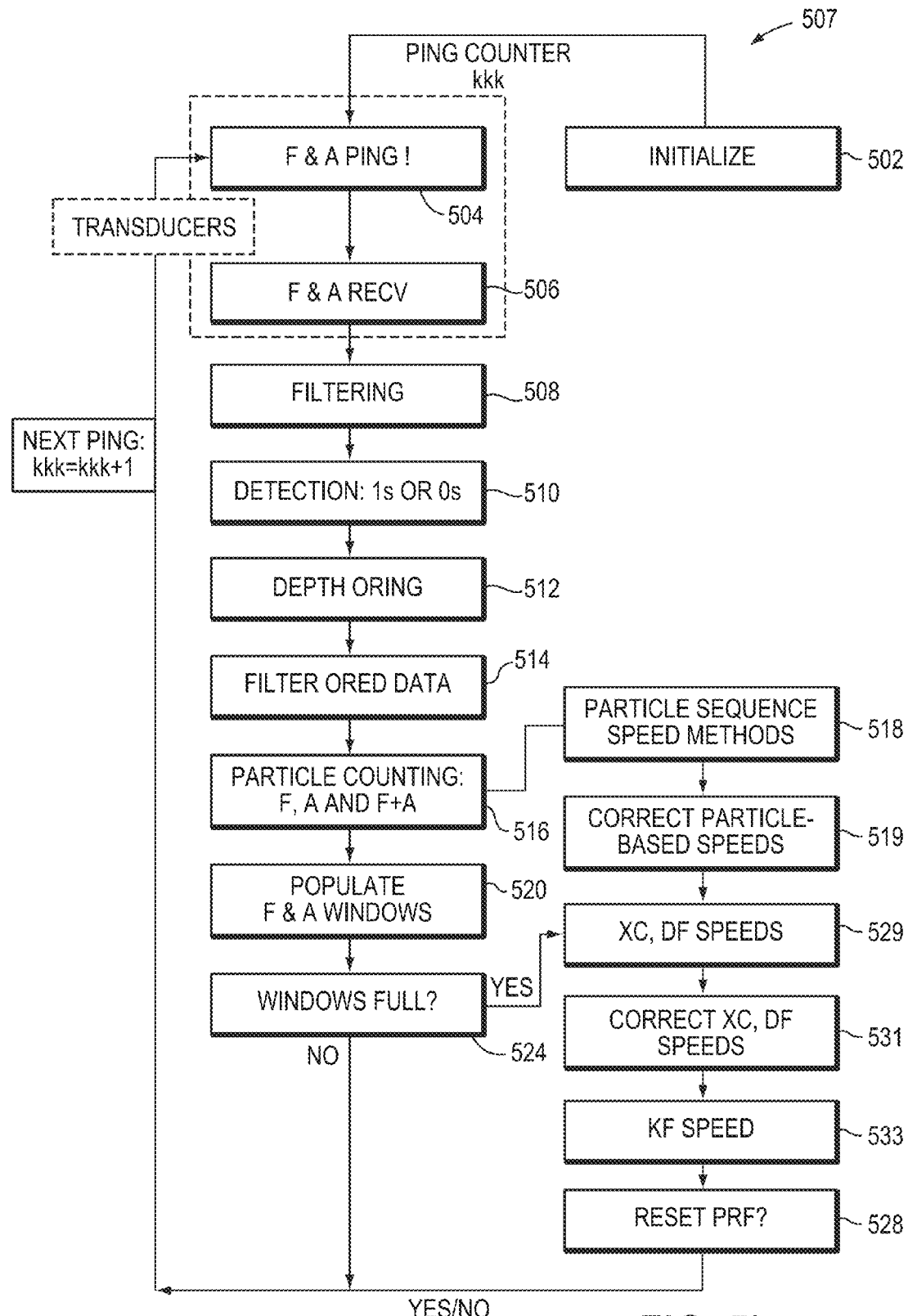
FIG. 5I is the flow diagram illustrating an alternative method of determining relative speeds of receivers including speed corrections based on cross-correlation and reference speeds.

FIG. 5I is a high-level flow diagram showing an alternative method 507 for determining speed using to receiver/transducers. FIG. 5I differs from FIG. 5A in that it includes two types of speed corrections performed before Kalman filtering. At 519, particle-based speeds, including those for the Fore and Aft transducers and for the combination are corrected. The correction is based on a known relationship between particle-based speed measurements made according to the particle detection scheme and cross-correlation-based speed measurements previously made using the same Fore and Aft transducers. This correction is explained in greater detail in FIG. 5J. At 529, cross-correlation and difference-function speeds are calculated, the same as at 526 in FIG. 5A. However, Kalman filtering is delayed until corrections to the measured speeds are applied.

At 531, cross-correlation and difference-function speeds are corrected based on a known relationship between the cross-correlation speeds and speed measurements from a reference device. This correction is explained in greater detail in FIG. 5K. At 533, after the particle-based speeds and the cross-correlation-based speeds have been corrected, the corrected speeds are filtered using a Kalman filter, as at 526 in FIG. 5A. In the embodiment 507 shown in FIG. 5I, the reference speed is obtained from global positioning satellite (GPS) device. However, in other embodiments, the reference speed may be obtained from other types of speed measurement devices, such as radar guns, acoustic Doppler speed devices, or paddle wheels.

The correction to the particle-based speeds performed at 519 can be helpful for at least two reasons. First, the cross-correlation and difference-function-based speeds generally have better accuracy than the particle-based speed measurements. Therefore, it is helpful to use cross-correlation-based speed measurements as a way to increase the accuracy of the particle-based measurements. Second, while cross-correlation- and difference-function-based measurements generally have better accuracy than particle-based measurements, cross-correlation-based measurements may not be available under certain water conditions. For example, cross-correlation and difference-function methods can fail when there are too many bubbles in the water or when the speed of a water vessel is too high or too low. Thus, during optimum conditions, cross-correlation-based speeds can be compared with particle-based speeds to develop a known relationship between the particle-based speed measurements and the cross-correlation-based speed measurements, and the particle-based speed measurements can be corrected, using the known relationships, to be more reliable for all conditions in which they are measured, including those conditions when cross-correlation is unavailable.

Even under optimum water conditions suitable for cross-correlation measurements, the accuracy of measured speeds can be limited by considerations such as boat design, sensor placement, boat tilt, and water flow patterns. Known relationships can be developed between cross-correlation and difference-function speeds and a reference device such as the GPS, and the correction to the cross-correlation and difference-function speeds performed at 531 is thus helpful to increase speed accuracy.

The known relationship can be developed for a particular boat model and then applied to all boats of that model. Alternatively, the known relationship can be developed based on a calibration performed on the boat during, for example, manufacturing or delivery.

Figure 5J:
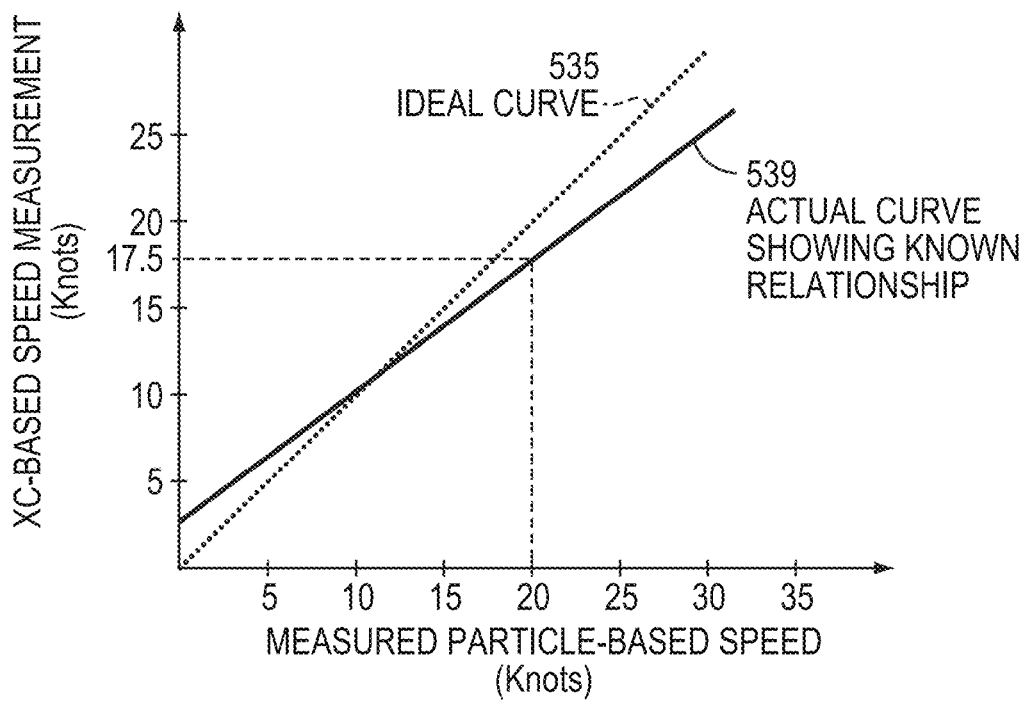
FIG. 5J is a graph showing correction of measured particle-based speeds based on measured cross-correlation speeds.

FIG. 5J is a graph showing a known relationship between particle-based speed measurements and cross-correlation-based speed measurements made using the Fore and Aft receivers. The known relationship in FIG. 5J is in the form of an actual curve 539 showing the known cross-correlation speed (along the vertical axis) as a function of measured particle-based speed. The curve is best-fit line for speed comparison data acquired using both methods at a range of speeds.

To apply a correction based on the graph in FIG. 5J, for example, at a measured particle-based speed of 20 knots, the corresponding best estimate for speed based on cross-correlation measurements would be 17.5 knots. One graph such as that in FIG. 5J can apply to all particle-based measurements, provided they are sufficiently the same. Alternatively, a separate graph such as that in FIG. 5J can be developed for each individual particle-based speed for the Fore and Aft receivers and for the combination. FIG. 5J also shows an ideal curve 535 that would indicate that no correction was required. Further, although the actual curve 539 is a line, the curve can be more complex. For example, the functional curve representing the needed correction can be a second-order or third-order nonlinear curve.

Figure 5K:
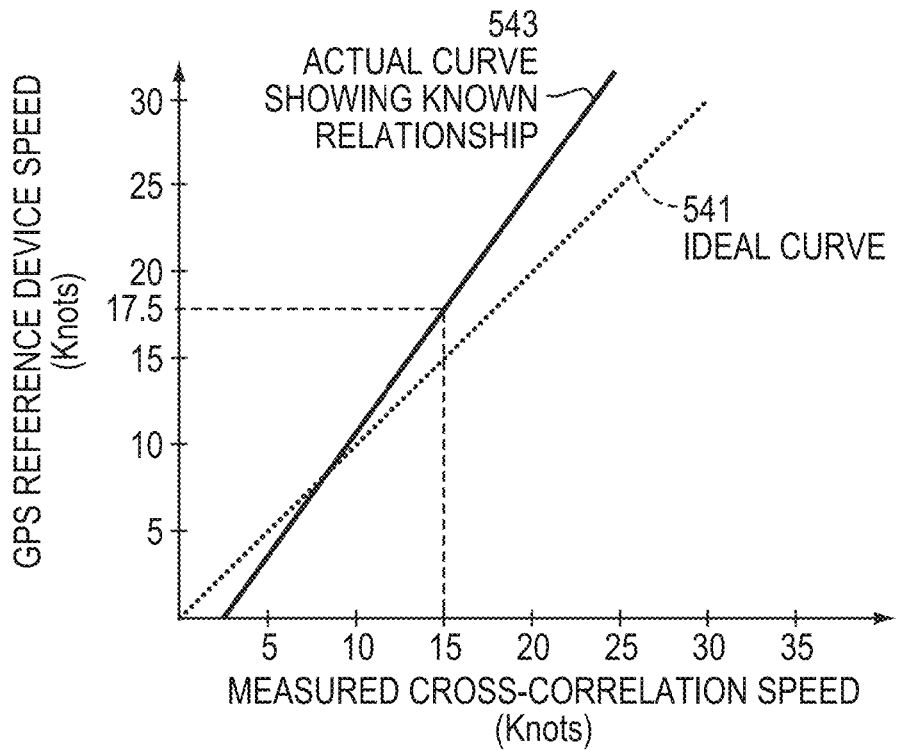
FIG. 5K is a graph showing correction of measured cross-correlation speeds based on GPS reference speeds.

FIG. 5K shows a curve 543 showing a known relationship between measured cross-correlation speeds and speeds from a GPS reference device. As an example of how to use the correction curve, at a measured cross-correlation speed of 15 knots, the curve 543 indicates that the GPS reference speed is 17.5 knots. The ideal curve 541 shown in FIG. 5K shows the relationship between the two speeds expected for ideal performance when no correction is required. The actual curve 543, like the actual curve 539 shown in FIG. 5J, is linear. However, the relationship can be more complex and can be represented by a nonlinear curve. Because the difference function is itself a function of the cross-correlation function, both speeds can be corrected by applying the known relationship between cross-correlation and reference speeds.

Figure 5L:
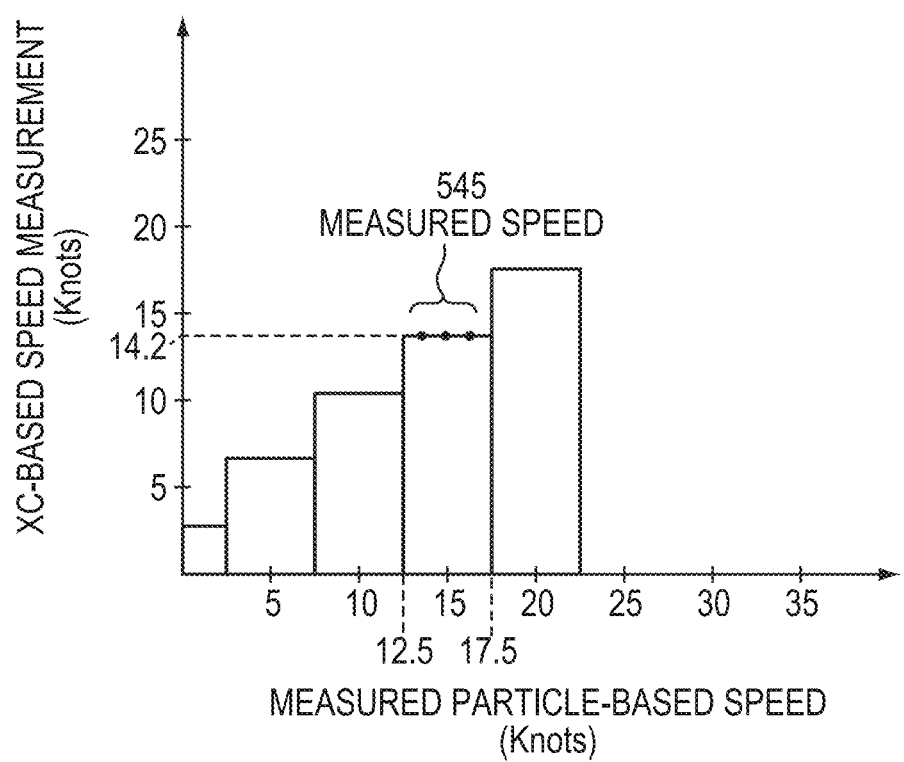
FIG. 5L is a diagram showing an alternative method of correcting measured particle-based speeds based on a histogram.

FIG. 5L shows an alternative way to correct measured particle-based speeds based on a histogram. Instead of the known relationship being expressed as a line or a function representing a line, as in FIGS. 5J and 5K, the data in FIG. 5L are binned and expressed as a histogram. Example data 545 are shown for one bin centered at 15 knots along the horizontal axis. Speed data 545 based on cross-correlation and on particle measurements are acquired and averaged. When the cross-correlation speed is measured to be 14.2 knots, the particle-based speed is measured as the values 545, which fall between 12.5 and 17.5 knots and have an average value of 15 knots. Thus, to apply this correction, for example, when the measured particle-based speed falls between 12.5 and 17.5 knots, the corrected speed based on cross-correlation values is as 14.2.

Embodiments are not limited to applying the corrections at 519 and 529 in FIG. 5I in the form of functions, such as those shown in FIGS. 5J and 5K, or histograms, such as that shown in FIG. 5L. These corrections can also be applied, for example, in the form of a lookup table. A lookup table can be developed to provide a corrected speed for each measured speed, or to provide various speed corrections to apply to respective measured speed ranges, for example. Further, corrections based on a known relationship with reference speeds can be applied to the particle speeds as well as to the cross-correlation and difference-function speeds using a method similar that described in conjunction with FIG. 5K. Moreover, the particle speeds may also be corrected based on known relationships with each other, similar to how they are corrected based on known relationships with the cross-correlation speeds at 519 in FIG. 5I.

Figure 6:
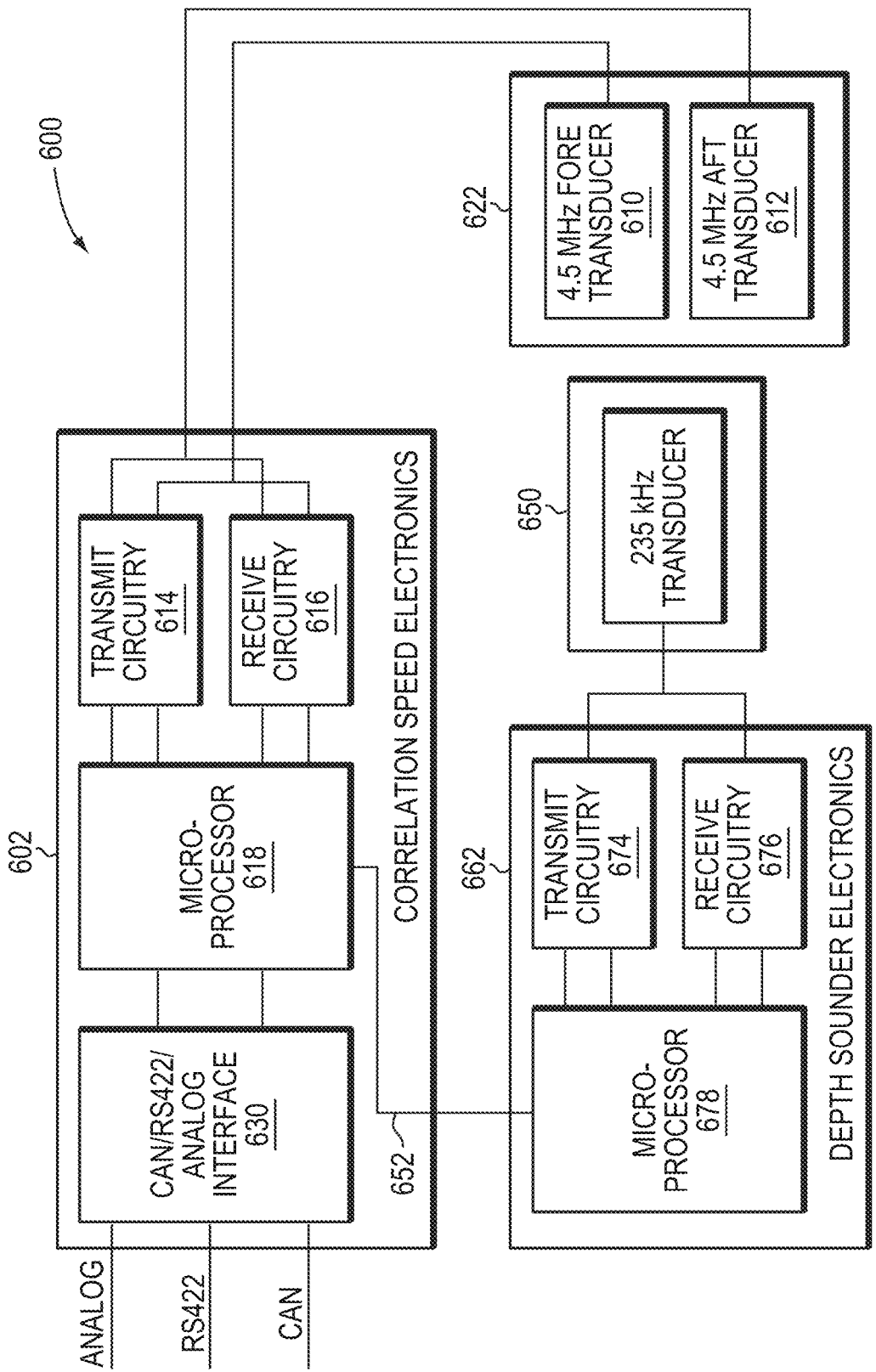
FIG. 6 is a block diagram of a speed sensor system configured to work in conjunction with a low-frequency depth sensor.

FIG. 6 is a block diagram of a speed and depth measurement system 600. Speed sensing aspects of depth measurement system 600 are similar to those of speed sensor 300 (FIG. 3). System 600 includes two transducers, FORE transducer 610 and AFT transducer 612 in a housing 622. Transducers 610 and 612 are configured to operate at a frequency of 4.5 MHz. In other embodiments, other frequencies in the MHz range may be used. Correlation speed electronics 602 include transmit circuitry 614 and receive circuitry 616, to which both transducers 610 and 612 are connected. The transmit circuitry 614 is configured to drive transducers 610, 612 to transmit both speed detection pulses and depth detection pulses when the transducers are operating in transmit mode, and the receive circuitry 616 is configured to sample both speed detection signals and depth detection signals generated by each transducer when operating in receive mode. The receive circuitry 616 includes one or more analog-to-digital converters (ADCs) for sampling the generated signals. Microprocessor 618 processes the sampled signals and performs speed calculations and depth calculations. Depths in the small range of about 4 mm to about 2 meters may be measured using transducers 610 and 612. System 600 also includes an interface 630 for controller area network (CAN), RS422, and analog communications.

Speed and depth measurement system 600 also includes depth sounder transducer 650 configured to operate at a frequency of 235 kHz. In other embodiments, other frequencies in the range of ten to hundreds of kHz may be used. Depth sounder electronics 662 include transmit circuitry 674 and receive circuitry 676. Transmit circuitry 674 is configured to drive transducer 650 to transmit depth detection pulses when transducer 650 is operating in transmit mode, and receive circuitry 676 is configured to sample depth detection signals generated by transducer 650 when operating in receive mode. Microprocessor 678 processes the depth detection signals to determine depths over a large depth range with a lower limit of about 1 meter. Microprocessor 678 also communicates large-range depth information to microprocessor 618 via a communications link 652. Microprocessor 618 may use depth information from either of the microprocessors 618, 678 to output a best measured depth, depending on the depth range required under the circumstances. In other embodiments, a single microprocessor may perform the functions of microprocessors 618, 678.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   sampling, by a sampling circuit, a first plurality of signals to produce a first plurality of sampled values, the first plurality of signals being related to an intensity of reflections received at a first receiver from a first monitored region containing one or more individual particles;
   processing, by a processing device, the first plurality of sampled values to detect the one or more individual particles to determine a speed of one of the first receiver and the individual particles with respect to the other; and
   applying, by the processing device, a correction to the determined speed based on a known relationship between particle-based speed measurements made by detecting individual particles and either (i) cross-correlation-based speed measurements made using the first receiver or (ii) speed measurements from a reference device.

2. The method of claim 1, further comprising:
   sampling a second plurality of signals to produce a second plurality of sampled values, the second plurality of signals being related to an intensity of reflections received at a second receiver from a second monitored region containing at least a subset of the particles; and
   processing the first and second pluralities of sampled values in conjunction with each other by detecting individual particles to determine a speed of one of the combination of the first and second receivers and the subset of particles with respect to the other.

3. The method of claim 2, further comprising applying a correction to the determined speed of one of the combination of the first and second receivers and the subset of particles with respect to the other, the correction being based upon a known relationship between particle-based speed measurements made by detecting individual particles and either (i) cross-correlation-based speed measurements made using the first and second receivers or (ii) speed measurements from a reference device.

4. The method of claim 2, further comprising:
filtering the first and second pluralities of sampled values to produce filtered data sets representing detection of at least one particle of the subset of particles; and
determining, based on the filtered data sets, a cross-correlation speed (XCS) of one of the combination of the first and second receivers and the at least one particle with respect to the other.

5. The method of claim 4, further comprising applying a correction to the cross-correlation speed based on a known relationship between cross-correlation speeds and speed measurements from a reference device.

6. A system comprising:
a sampling circuit for sampling a first plurality of signals to produce a first plurality of sampled values, the first plurality of signals being related to an intensity of reflections received at a first receiver from a first monitored region containing one or more individual particles; and
a processing device for processing the first plurality of sampled values to detect the one or more individual particles to determine a speed of one of the first receiver and the particles with respect to the other,
the processing device further configured to apply a correction to the determined speed based on a known relationship between particle-based speed measurements made by detecting individual particles and either (i) cross-correlation-based speed measurements made using the first receiver or (ii) speed measurements from a reference device.

7. The system of claim 6, wherein the sampling circuit is further configured to sample a second plurality of signals to produce a second plurality of sampled values, the second plurality of values being related to an intensity of reflections received at a second receiver from a second monitored region containing at least a subset of the particles, and wherein the processing device is further configured to process the first and second pluralities of sampled values in conjunction with each other by detecting individual particles to determine a speed of one of the combination of the first and second receivers and the subset of particles with respect to the other.

8. The system of claim 7, wherein the processing device is configured to apply a correction to the determined speed of one of the combination of the first and second receivers and the subset of particles with respect to the other, the correction being based on a known relationship between particle-based speed measurements made by detecting individual particles and either (i) cross-correlation-based speed measurements made using the first and second receivers or (ii) speed measurements from a reference device.

9. The system of claim 7, wherein the processing device is further configured to filter the first and second pluralities of sampled values to produce filtered data sets representing detection of at least one particle of the subset of particles, and wherein the processing device is further configured to determine, based on the filtered data sets, a cross-correlation speed (XCS) of one of the combination of the first and second receivers and the at least one particle with respect to the other.

10. The system of claim 9, wherein the processing device is further configured to apply a correction to the cross-correlation speed based on a known relationship between cross-correlation speeds and speed measurements from a reference device.

11. A method comprising:
sampling, by a sampling circuit, signals related to intensity of reflections received at an acoustic receiver from a monitored region containing one or more individual particles;
distinguishing, by a processing device, the individual particles based on the sampled signals by mapping the particles into respective depth zones; and
determining, by the processing device, a speed of the acoustic receiver with respect to the one or more individual particles distinguished.

12. The method of claim 11, wherein determining the speed includes calculating a cross-correlation speed.

13. The method of claim 12, further comprising applying a correction to the cross-correlation speed based on a known relationship between cross-correlation speeds and speed measurements from a reference device.

14. The method of claim 11, wherein determining the speed includes determining a time during which a particle of the one or more individual particles is detected by the receiver.

* * * * *